United States Patent
Sugita et al.

(10) Patent No.: US 8,406,316 B2
(45) Date of Patent: Mar. 26, 2013

(54) INFORMATION PROCESSING APPARATUS AND MODE SWITCHING METHOD

(75) Inventors: Takehiro Sugita, Kanagawa (JP); Isao Hidaka, Tokyo (JP); Tatsuo Shimizu, Chiba (JP)

(73) Assignee: Sony Corporation, Tokyo (JP)

( * ) Notice: Subject to any disclaimer, the term of this patent is extended or adjusted under 35 U.S.C. 154(b) by 365 days.

(21) Appl. No.: 12/795,446

(22) Filed: Jun. 7, 2010

(65) Prior Publication Data

US 2010/0316099 A1 Dec. 16, 2010

(30) Foreign Application Priority Data

Jun. 16, 2009 (JP) .............................. P2009-143205

(51) Int. Cl.
*H04L 27/00* (2006.01)

(52) U.S. Cl. ...................................... 375/259; 370/229

(58) Field of Classification Search .......... 375/259–260, 375/295; 370/229–230, 235
See application file for complete search history.

(56) References Cited

U.S. PATENT DOCUMENTS

| | | | | |
|---|---|---|---|---|
| 4,525,834 A | * | 6/1985 | Schenkel et al. | 398/71 |
| 5,299,228 A | * | 3/1994 | Hall | 370/335 |
| 5,416,773 A | * | 5/1995 | Gamm | 370/369 |
| 5,790,174 A | * | 8/1998 | Richard et al. | 725/99 |
| 2008/0152350 A1 | * | 6/2008 | Sheng | 398/140 |
| 2010/0002659 A1 | * | 1/2010 | Doi et al. | 370/338 |
| 2010/0027710 A1 | * | 2/2010 | Fukuda et al. | 375/293 |

FOREIGN PATENT DOCUMENTS

| | | |
|---|---|---|
| JP | 03-109843 | 5/1991 |
| JP | 02005223443 A | * 8/2005 |

* cited by examiner

*Primary Examiner* — Jean B Corrielus
(74) *Attorney, Agent, or Firm* — Finnegan, Henderson, Farabow, Garrett & Dunner, L.L.P.

(57) ABSTRACT

Provided is an information processing apparatus which includes a first-module including a first narrow-band communicator for performing narrow band communication with a second-module, a first broadband-communicator for performing broadband communication with the second-module, and a first controller for controlling an operation state of the first broadband-communicator according to an operation mode, and a second-module including a second narrow-band communicator for performing narrow-band communication with the first-module, a second broadband-communicator for performing broadband communication with the first-module, and a second controller for controlling an operation state of the second broadband-communicator according to an operation mode. The first controller places the first broadband-communicator in an operation state in a first mode, and places the first broadband-communicator in a standby state in a second mode. The second controller places the second broadband-communicator in an operation state in the first mode, and places the second broadband-communicator in a standby state in the second mode.

14 Claims, 20 Drawing Sheets

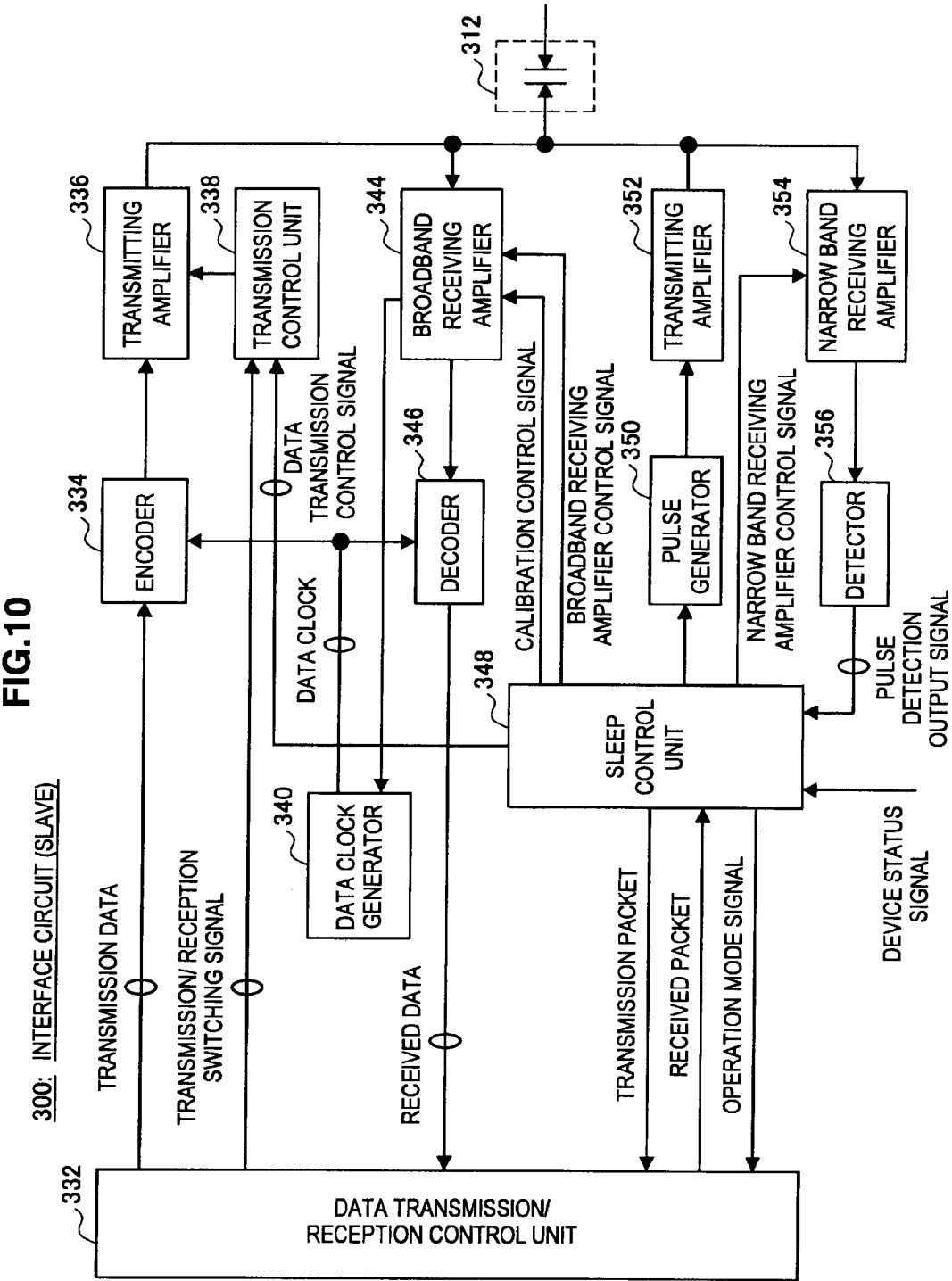

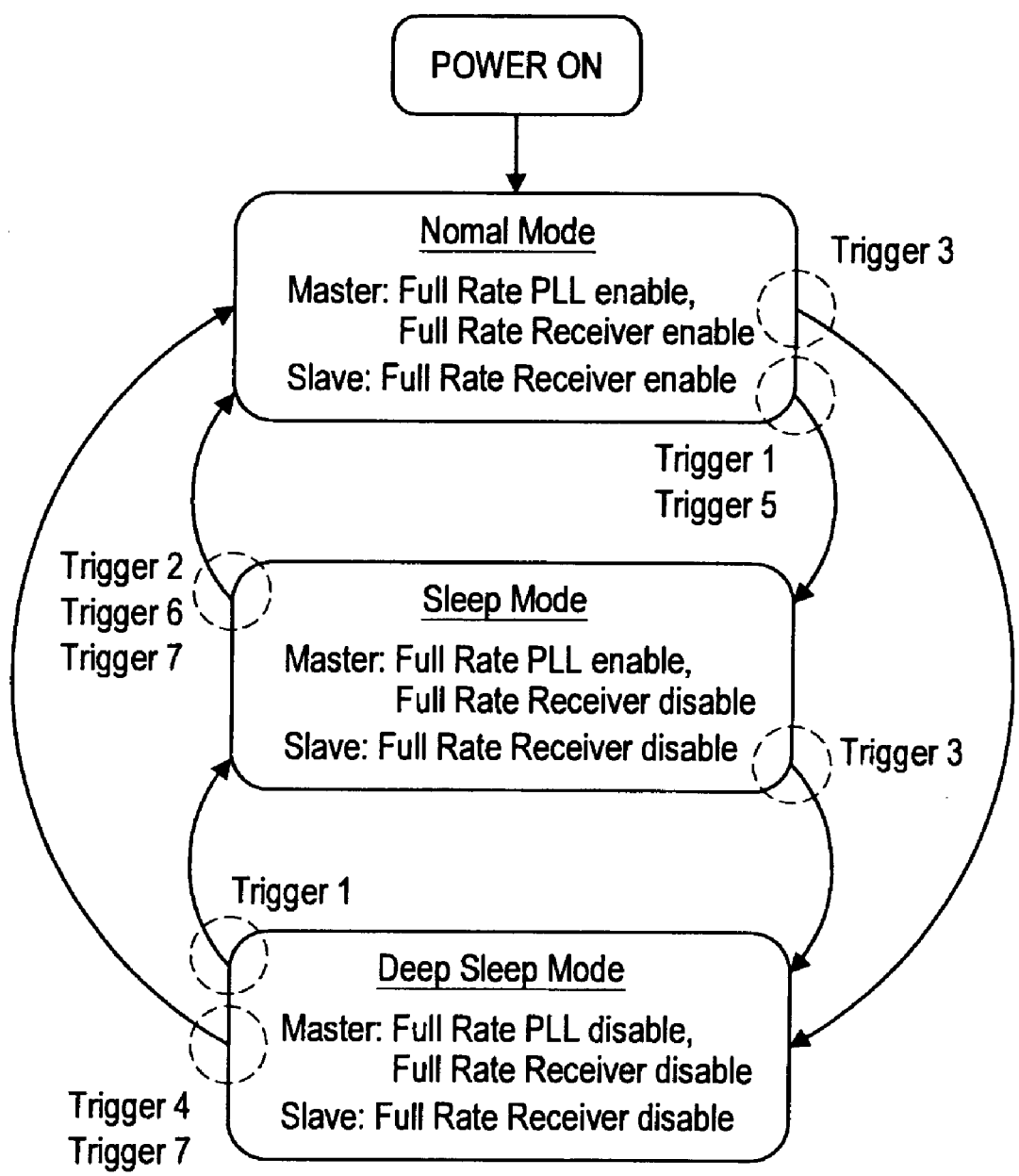

FIG.12

DISTINCTION BETWEEN TRIGGERS

| TYPES | CONTENTS |
|---|---|
| Trigger 1 | INSTRUCTION FROM Platform (SLEEP1: Sleep) |
| Trigger 2 | INSTRUCTION FROM Platform (SLEEP1: Active) |
| Trigger 3 | INSTRUCTION FROM Platform (SLEEP2: Deep Sleep) |
| Trigger 4 | INSTRUCTION FROM Platform (SLEEP2: Sleep) |
| Trigger 5 | AUTOMATIC DETECTION BY VSOP Master (Sleep) |
| Trigger 6 | AUTOMATIC DETECTION BY VSOP Master (Active) |
| Trigger 7 | AUTOMATIC DETECTION AT Display (Active) |

ACTIVATION SIGNAL (CLOCK PULSE)

CLOCK PULSE DETECTION CIRCUIT

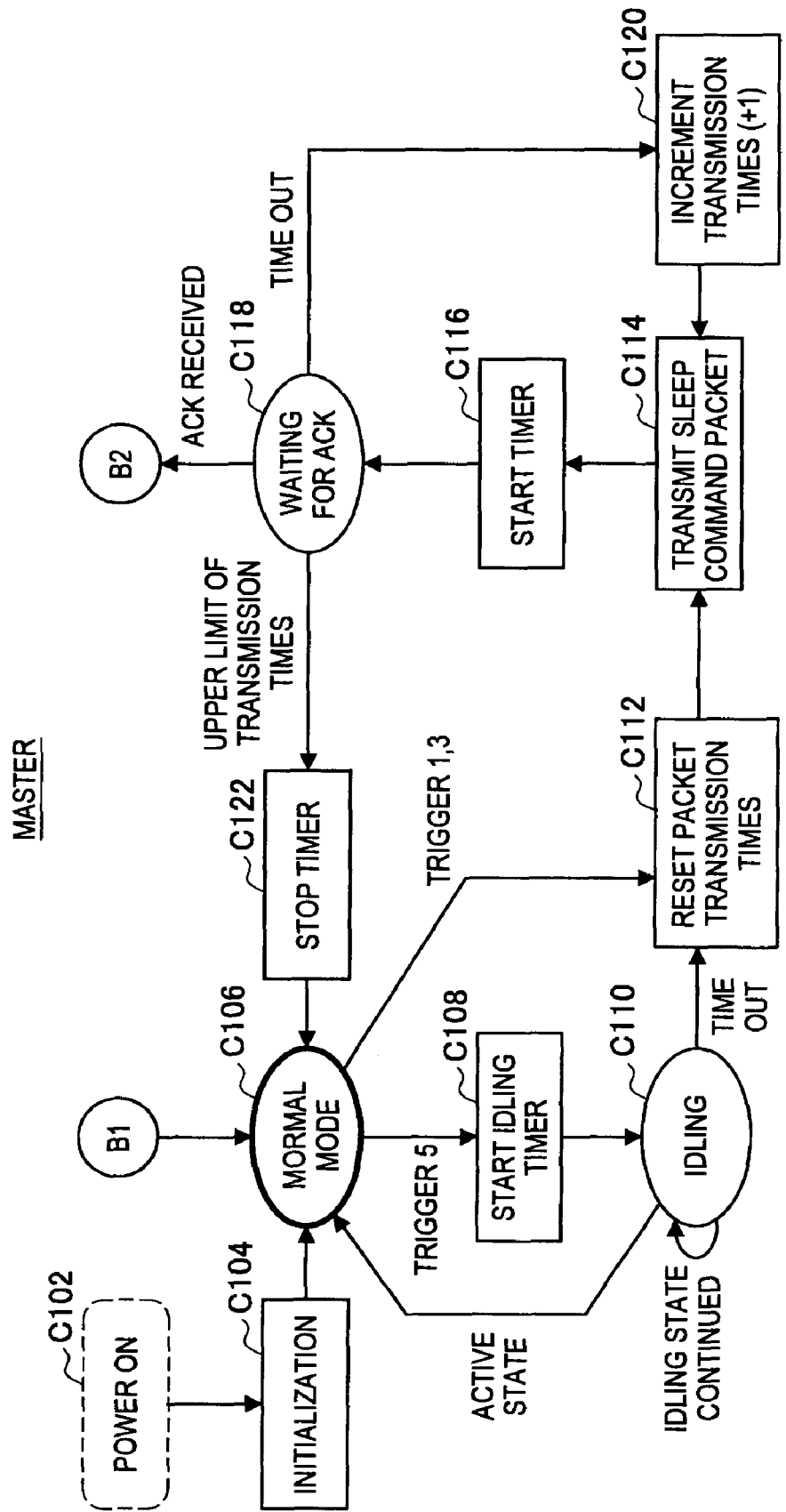

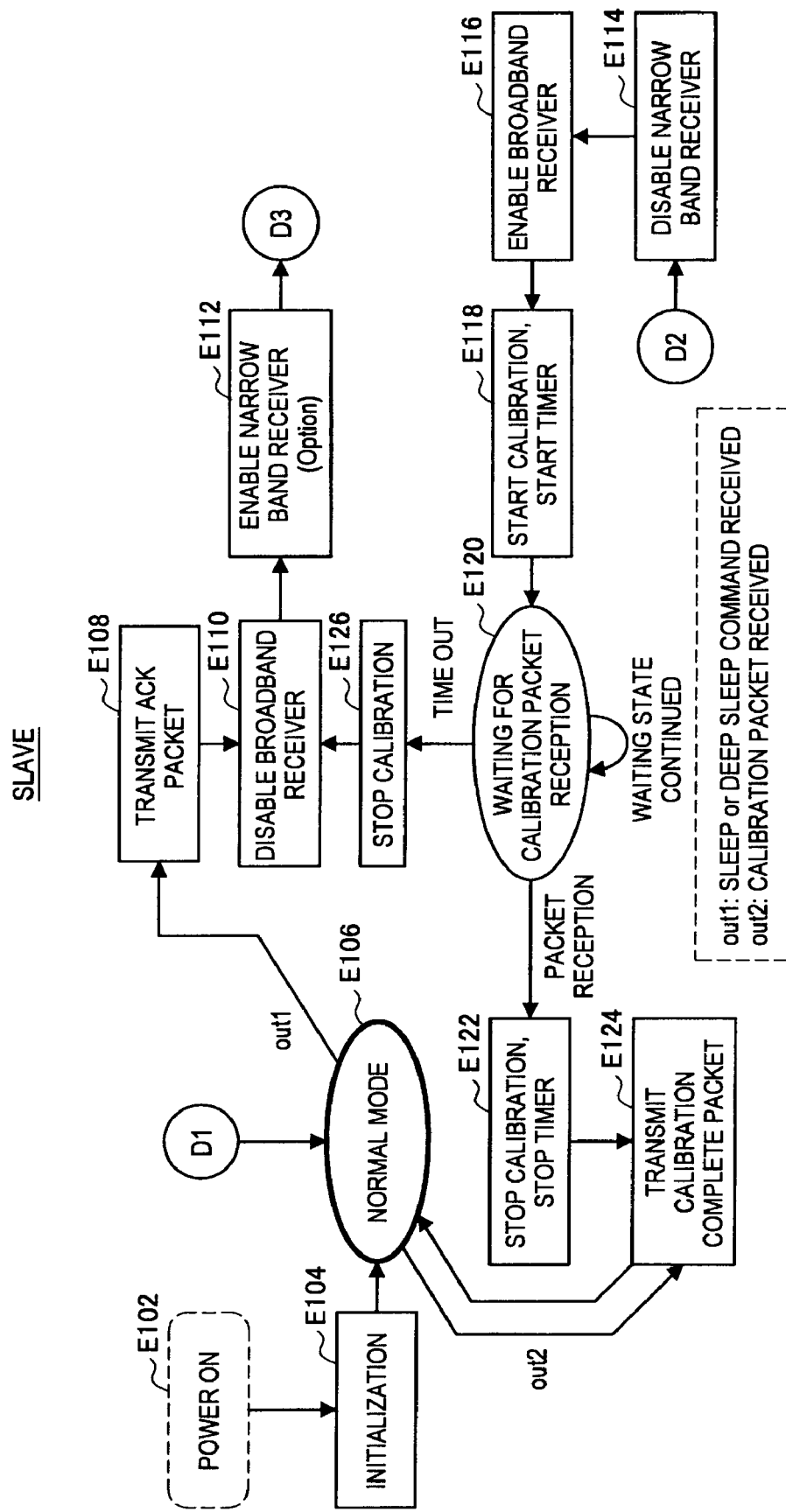

INFORMATION PROCESSING APPARATUS AND MODE SWITCHING METHOD

CROSS-REFERENCE TO RELATED APPLICATIONS

The present application contains subject matter related to that disclosed in Japanese Priority Patent Application JP 2009-143205 filed in the Japan Patent Office on Jun. 16, 2009, the entire content of which is hereby incorporated by reference.

BACKGROUND OF THE INVENTION

1. Field of the Invention

The present invention relates to an information processing apparatus, and a mode switching method.

2. Description of the Related Art

Most information processing apparatuses such as mobile phone and notebook personal computer (hereinafter, a notebook PC) use a movable member for a hinge portion connecting a main body to be operated by a user and a display portion on which information is displayed. However, a large number of signal lines and power lines pass through the hinge portion, and a method for maintaining reliability of the wiring is desired. Reducing the number of the signal lines passing through the hinge portion comes first to mind. Therefore, data transmission processing between the main body and the display portion is made to be performed by using a serial transmission method instead of a parallel transmission method. When the serial transmission method is used, the number of signal lines is decreased.

In the serial transmission method, data is encoded and then transmitted. At that time, for example, a Non Return to Zero (NRZ) encoding scheme, a Manchester encoding scheme, an Alternate Mark Inversion (AMI) encoding scheme, or the like is used as the encoding scheme. For example, JP-A-1991-109843 discloses a technology for transmitting data by using an AMI code, which is a representative example of a bipolar code. The patent document also discloses a technology according to which a data clock is transmitted after being expressed by an intermediate value of a signal level, and the receiving side regenerates the data clock based on the signal level.

SUMMARY OF THE INVENTION

However, in an information processing apparatus such as a notebook PC, even if the serial transmission method using the above code is used, the number of signal lines wired in the hinge portion is still large. For example, in a case of a notebook PC, there are wiring lines related to an LED backlight for illuminating an LCD in addition to video signals to be transmitted to the display portion, and thus several tens of signal lines including these signal lines are wired in the hinge portion. The LCD is an abbreviation for Liquid Crystal Display, and the LED is an abbreviation for Light Emitting Diode.

To reduce the number of signal lines which is still large, an encoding scheme (hereinafter, new scheme) has been recently developed according to which a DC component is not included and according to which a clock component can be easily extracted from a received signal. Since a transmission signal generated based on this new scheme does not include a DC component, it can be transmitted by being superimposed on DC power. Furthermore, by detecting the polarity inversion cycle of the transmission signal, a clock can be regenerated by the receiving side without using a PLL. Therefore, a plurality of signal lines can be bound together, and thereby the number of signal lines can be reduced and also the power consumption and the circuit scale can be reduced. The PLL is an abbreviation for Phase Locked Loop.

As described above, a reduction in power consumption as well as a reduction in the number of signal lines is an important issue for a small electronic device typified by the notebook PC, the mobile phone and the like. The code according to the new scheme mentioned above contributes to the reduction in power consumption by making it unnecessary to provide a PLL at the receiving side. In this manner, power consumption can be significantly reduced by omitting circuits to be driven during the operation of the electronic device as much as possible. However, with this approach, it is difficult to reduce power consumption of a circuit necessary for the operation of the electronic device. In view of such concern, a method can be conceived of switching between operation and standby of each circuit according to the operation status of the electronic device.

For example, JP-A-2002-368676 discloses a technology of intermittently halting or starting a system clock generation operation of a reception control unit according to the operation status of a mobile communication terminal. However, a method of controlling a plurality of communication means used for data transmission within a device and controlling the operation/standby in accordance with the operation status of a device in consideration of the property of each communication means is not disclosed. Particularly, no disclosure or suggestion is made on a method of switching between the operation and the standby of these means according to the operation status of a device including within itself broadband communication means and narrow band communication means.

In light of the foregoing, it is desirable to provide an information processing apparatus and a mode switching method which are novel and improved, and which are capable of realizing power saving in a device which realizes, by using the same communication medium, narrow band communication and broadband communication used for internal data transmission.

According to an embodiment of the present invention, there is provided an information processing apparatus which includes a first module including a first narrow band communication unit for performing narrow band communication with a second module, a first broadband communication unit for performing broadband communication with the second module, and a first operation control unit for controlling an operation state of the first broadband communication unit according to an operation mode, and a second module including a second narrow band communication unit for performing narrow band communication with the first module, a second broadband communication unit for performing broadband communication with the first module, and a second operation control unit for controlling an operation state of the second broadband communication unit according to an operation mode. The first operation control unit places the first broadband communication unit in an operation state in a first operation mode, and places the first broadband communication unit in a standby state in a second operation mode. The second operation control unit places the second broadband communication unit in an operation state in the first operation mode, and places the second broadband communication unit in a standby state in the second operation mode.

The first module may be configured to further include a mode switching unit for transmitting, via the first broadband communication unit, a mode switching signal for switching the operation mode from the first operation mode to the second operation mode. The second operation control unit may be configured to transmit a response signal indicating a reception success of the mode switching signal to the first module via the second broadband communication unit in case the mode switching signal is received via the second broadband communication unit, and then to place the second broadband communication unit in a standby state. The first operation control unit may be configured to place the first broadband communication unit in a standby state in case the response signal is received via the first broadband communication unit.

The first module may be configured to further include a first clock pulse transmission unit for transmitting a clock pulse to the second module. In case of switching from the second operation mode to the first operation mode, the first operation control unit may place the first broadband communication unit in an operation state, the first clock pulse transmission unit may transmit the clock pulse to the second module, and the second operation control unit may place the second broadband communication unit in an operation state in case the clock pulse transmitted by the first clock pulse transmission unit is received.

The first clock pulse transmission unit may be configured to transmit the clock pulse to the second module via the first narrow band communication unit. The second operation control unit may be configured to place the second broadband communication unit in an operation state in case the clock pulse is received via the second narrowband communication unit.

In case the first broadband communication unit transitions to an operation state under a control of the first operation control unit, the first module may transmit a packet via the first broadband communication unit. In case the second broadband communication unit transitions to an operation state under a control of the second operation control unit, the second module may transmit a packet via the second broadband communication unit. Completion of switching from the second operation mode to the first operation mode may be confirmed by confirming reception of a packet at the first broadband communication unit and the second broadband communication unit.

The second module may be configured to further include a second clock pulse transmission unit for transmitting a clock pulse to the first module. In case of switching from the second operation mode to the first operation mode, the second operation control unit may place the second broadband communication unit in an operation state, the second clock pulse transmission unit may transmit the clock pulse to the first module, and the first operation control unit may place the first broadband communication unit in an operation state in case the clock pulse transmitted by the second clock pulse transmission unit is received.

The second clock pulse transmission unit may be configured to transmit the clock pulse to the first module via the second narrow band communication unit. The first operation control unit may be configured to place the first broadband communication unit in an operation state in case the clock pulse is received via the first narrow band communication unit.

In case the first broadband communication unit transitions to an operation state under a control of the first operation control unit, the first module may transmit a packet via the first broadband communication unit. In case the second broadband communication unit transitions to an operation state under a control of the second operation control unit, the second module may transmit a packet via the second broadband communication unit. Completion of switching from the second operation mode to the first operation mode may be confirmed by confirming reception of a packet at the first broadband communication unit and the second broadband communication unit.

The second module may be configured to further include a clock generation unit for generating a clock. The second operation control unit may be configured to place the second broadband communication unit in a standby state and to place the clock generation unit in a standby state in a third operation mode different from the first and the second operation modes.

The first broadband communication unit may be configured to encode data into a code form not including a DC component, and to transmit the data.

The first broadband communication unit may be configured to encode data into a code form which does not include a DC component and whose polarity is inverted every half cycle of a clock, and to transmit the data. The second broadband communication unit may be configured to regenerate, by detecting a polarity inversion cycle, the clock from a received waveform of the data transmitted by the first broadband communication unit, and to decode the data by using the clock.

The first broadband communication unit may be configured to generate encoded data by encoding data into a code form not including a DC component, to encode the data into a code form obtained by synchronously adding a clock having amplitude larger than that of the encoded data, and to transmit the data.

The first module may be configured to further include a computational processing unit for generating data to be transmitted via the first broadband communication unit. The second module may be configured to further include an output unit for outputting data received via the second broadband communication unit. The output unit may be a combination of one or more of an audio output device, an image output device and a communication device.

The first module may be configured to further include an output unit for outputting data received via the first broadband communication unit. The second module may be configured to further include a computational processing unit for generating data to be transmitted via the second broadband communication unit. The output unit may be a combination of one or more of an audio output device, an image output device and a communication device.

According to another embodiment of the present invention, there is provided a mode switching method performed by an information processing apparatus including a first module that includes a first narrow band communication unit for performing narrow band communication with a second module and a first broadband communication unit for performing broadband communication with the second module and the second module that includes a second narrow band communication unit for performing narrow band communication with the first module and a second broadband communication unit for performing broadband communication with the first module, including the steps of placing the first broadband communication unit in a standby state and placing the second broadband communication unit in a standby state in case of transition from a first operation mode to a second operation mode, and placing the first broadband communication unit in an operation state and placing the second broadband communication unit in an operation state in case of transition from the second operation mode to the first operation mode.

According to the embodiments of the present invention described above, power saving can be realised in a device which realizes, by using the same communication medium,

BRIEF DESCRIPTION OF THE DRAWINGS

FIG. 10 is an explanatory diagram showing a configuration example of an interface circuit provided with a mode switching control function of a mobile terminal according to an embodiment of the present invention (slave);

FIG. 11 is an explanatory diagram showing state transition between modes with regard to a method of switching between modes according to an embodiment of the present invention;

FIG. 12 is an explanatory diagram showing contents of triggers at the time of starting a mode switching process according to an embodiment of the present invention;

FIG. 16C is an explanatory diagram showing in detail process steps to be performed at the master side at the time of switching to each mode, with regard to a mode switching method according to an embodiment of the present invention;

FIG. 17B is an explanatory diagram showing in detail process steps to be performed at the slave side at the time of switching to each mode, with regard to a mode switching method according to an embodiment of the present invention.

DETAILED DESCRIPTION OF THE EMBODIMENT(S)

Figure 1:
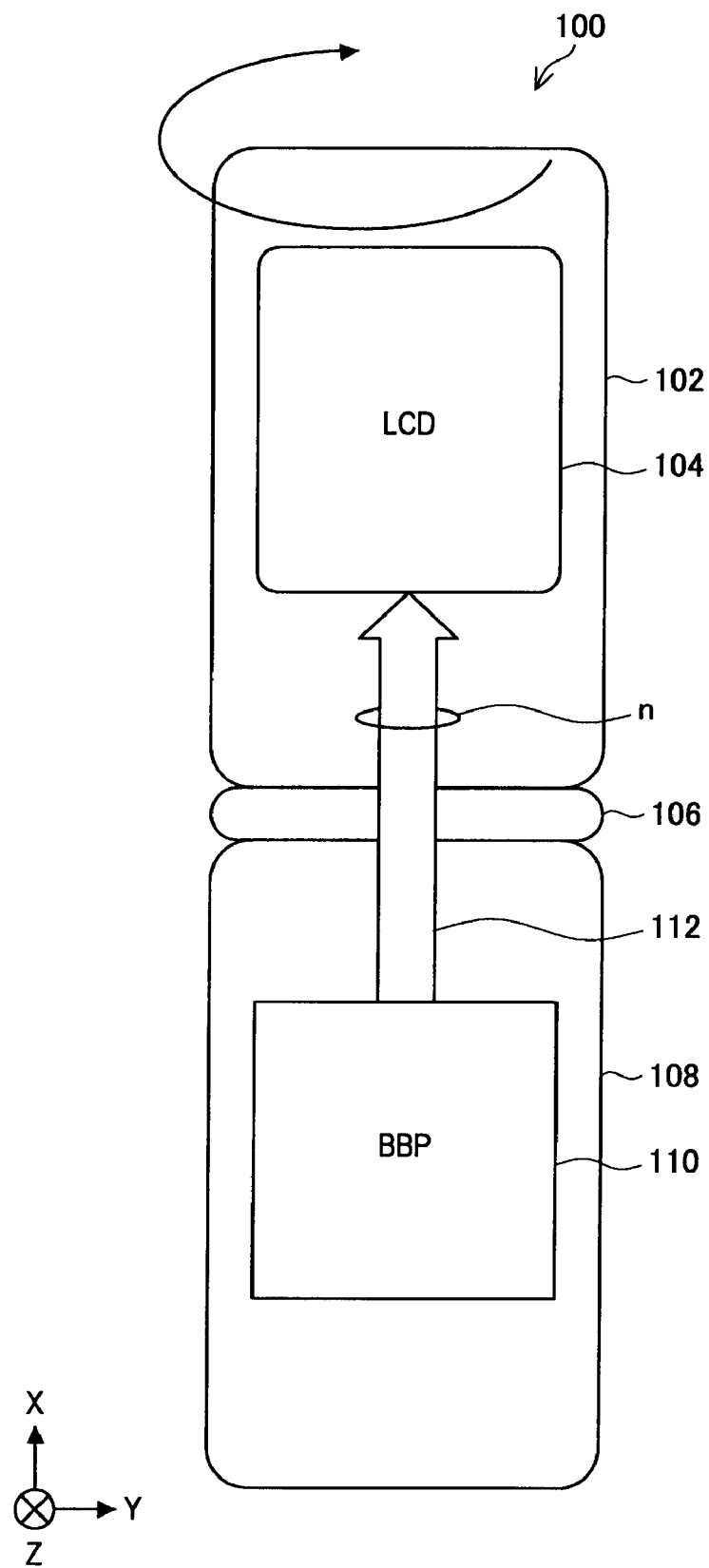
FIG. 1 is an explanatory diagram showing a device configuration example of a mobile terminal according to a parallel transmission scheme.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Description>

The flow of a description of an embodiment of the present invention described below will be briefly mentioned. First, a device configuration of a mobile terminal 100 adopting a parallel transmission scheme will be described with reference to FIG. 1. Herein, a demerit relating to the parallel transmission scheme will be pointed out. Then, a device configuration of a mobile terminal 130 adopting a serial transmission scheme will be described with reference to FIG. 2. Then, a functional configuration of a general mobile terminal 130 will be described with reference to FIG. 3. Herein, a brief description of an AMI code will be made with reference to FIG. 4. The AMI is an abbreviation for Alternate Mark Inversion. Then, a functional configuration of a mobile terminal 130 adopting an encoding method according to the above-described new scheme will be described with reference to FIG. 5. Then, an encoding method according to the above-described new scheme will be described with reference to FIG. 6.

Then, a configuration example of an interface circuit 200 in a mobile terminal or the like provided with a function of switching to a sleep mode will be described with reference to FIGS. 7 and 8. Next, a configuration example of an interface circuit 300 in a mobile terminal or the like provided with a function of switching to a sleep mode according to the present embodiment will be described with reference to FIGS. 9 and 10. Next, with regard to a mode switching method according to the present embodiment, a method of transitioning a state from a normal mode to a sleep mode and a method of returning the state from the sleep mode to the normal mode will be described with reference to FIGS. 11 to 15. Next, details of state transition in the mode switching method according to the present embodiment will be described with reference to FIGS. 16A to 16C and FIGS. 17A and 17B. Lastly, the technical idea of the embodiment will be summarized and operational effects obtained by the technical idea will be briefly described.

(Description Items)

1: Introduction 1-1: Configuration of Mobile Terminal 100 Adopting Parallel Transmission Scheme 1-2: Configuration of Mobile Terminal 130 Adopting Serial Transmission Scheme 1-3: Functional Configuration of Mobile Terminal 130 according to New Scheme 1-4: Configuration Example of Interface Circuit Provided With Mode Switching Function 2: Embodiment
2-1: Configuration Example of Interface Circuit Provided With Mode Switching Function
2-2: Outline of Mode Switching Method
2-3: Details of Mode Switching Method
3: Conclusion

1: INTRODUCTION

First, before describing in detail the technology according to an embodiment of the present invention, issues to be solved by the present embodiment will be briefly summarized.

(1-1: Configuration of Mobile Terminal 100 Adopting Parallel Transmission Scheme)

First, a device configuration of a mobile terminal 100 adopting a parallel transmission scheme will be briefly described with reference to FIG. 1. FIG. 1 is an explanatory diagram showing an example of the device configuration of the mobile terminal 100 adopting a parallel transmission scheme. In FIG. 1, a mobile phone is schematically illustrated as an example of the mobile terminal 100. However, the application scope of the technology described below is not limited to a mobile phone. For example, it can be applied to an information processing apparatus such as a notebook PC or various portable electronic devices.

As shown in FIG. 1, the mobile terminal 100 mainly includes a display unit 102, a liquid crystal unit 104 (LCD), a connecting unit 106, an operation unit 108, a baseband processor 110 (BBP), and a parallel signal path 112. The LCD is an abbreviation for Liquid Crystal Display. Additionally, the display unit 102 and the operation unit 108 may be respectively referred to as a display side and a main body side. Additionally, for the sake of explanation, a case where an image signal is transmitted through the parallel signal path 112 will be described as an example. Of course, the type of a signal to be transmitted through the parallel signal path 112 is not limited to such, and it may also be a control signal, an audio signal, or the like, for example.

As shown in FIG. 1, the liquid crystal unit 104 is provided on the display unit 102. The image signal transmitted through the parallel signal path 112 is input to the liquid crystal unit 104. The liquid crystal unit 104 displays an image based on the input image signal. Also, the connecting unit 106 is a member connecting the display unit 102 and the operation unit 108. The connecting member forming the connecting unit 106 has a structure that enables the display unit 102 to rotate 180 degrees in a Z-Y plane, for example. The connecting member can also be formed such that the display unit 102 can rotate in an X-Z plane. In this case, the mobile terminal 100 will have a structure capable of folding. Additionally, the connecting member may also have a structure that allows the display unit 102 to move freely in any direction.

The baseband processor 110 is a computational processing unit that provides the mobile terminal 100 with a communication control function and an application execution function. A parallel signal that is output from the baseband processor 110 is transmitted through the parallel signal path 112 to the liquid crystal unit 104 of the display unit 102. The parallel signal path 112 is provided with a plurality of signal lines. In the case of a mobile phone, for example, the number n of the signal lines is approximately fifty lines. The image signal transmission speed is approximately 130 Mbps in a case where the resolution of the liquid crystal unit 104 is QVGA. The parallel signal path 112 is wired such that the lines pass through the connecting unit 106.

In other words, the plurality of signal lines that form the parallel signal path 112 are provided in the connecting unit 106. As described above, if the range of movement of the connecting unit 106 is increased, the risk increases that the movement will inflict damage on the parallel signal path 112. This would result in impairment of the reliability of the parallel signal path 112. On the other hand, if the reliability of the parallel signal path 112 is maintained, the range of movement of the connecting unit 106 will be restricted. It is for this reason that the serial transmission scheme has come to be widely used in mobile phones and the like in order to maintain the reliability of the parallel signal path 112 while also increasing the degree of freedom of the movable member that forms the connecting unit 106.

(1-2: Configuration of Mobile Terminal 130 Adopting Serial Transmission Scheme)

Figure 2:
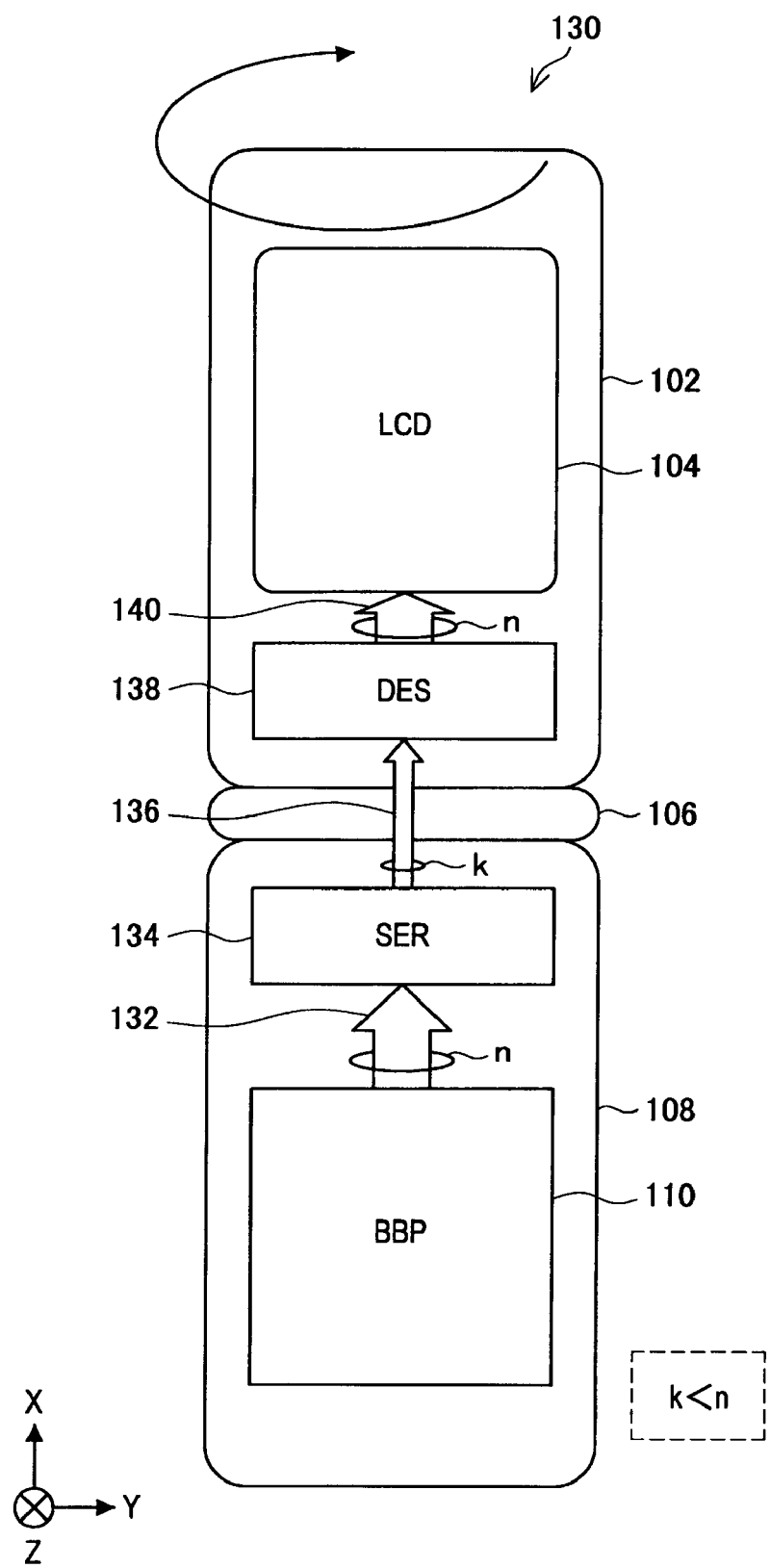
FIG. 2 is an explanatory diagram showing a device configuration example of a mobile terminal according to a serial transmission scheme.

Now, a device configuration of a mobile terminal 130 adopting the serial transmission scheme will be briefly described with reference to FIG. 2. FIG. 2 is an explanatory diagram showing an example of the device configuration of the mobile terminal 130 adopting the serial transmission scheme. In FIG. 2, a mobile phone is schematically illustrated as an example of the mobile terminal 130. However, the application scope of the technology described below is not limited to a mobile phone. For example, it can be applied to an information processing apparatus such as a notebook PC or various portable electronic devices. Furthermore, structural elements having functions substantially the same as those of the mobile terminal 100 of the parallel transmission scheme shown in FIG. 1 will be denoted with the same reference numerals, and detailed explanation of these structural elements will be omitted.

As shown in FIG. 2, the mobile terminal 130 mainly includes the display unit 102, the liquid crystal unit 104 (LCD), the connecting unit 106, and the operation unit 108. Also, the mobile terminal 130 includes the baseband processor 110 (BBP), parallel signal paths 132, 140, a serializer 134, a serial signal path 136, and a deserializer 138.

Unlike the mobile terminal 100 that is described above, the mobile terminal 130 transmits the image signal by the serial transmission scheme through the serial signal path 136 that is wired through the connecting unit 106. Therefore, the serializer 134 is provided in the operation unit 108 to serialize the parallel signal that is output from the baseband processor 110. On the other hand, the deserializer 138 is provided in the display unit 102 to parallelize the serial signal that is transmitted through the serial signal path 136.

The serializer 134 converts the parallel signal that is output from the baseband processor 110 and input through the parallel signal path 132 into a serial signal. The serial signal that has been converted by the serializer 134 is input to the deserializer 138 through the serial signal path 136. When the serial signal is input, the deserializer 138 restores the original parallel signal from the input serial signal. Then, the deserializer 138 inputs the parallel signal to the liquid crystal unit 104 through the parallel signal path 140.

In the serial signal path 136, a data signal that is encoded by the NRZ encoding scheme, for example, may be transmitted on its own, or alternatively, the data signal and a clock signal may be transmitted together. The number k of the lines in the serial signal path 136 is significantly less than the number n of the lines in the parallel signal path 112 in the mobile terminal 100 in FIG. 1 ($1 \leq k \ll n$). For example, the number k of the lines can be reduced to only a few lines. Therefore, the degree of freedom relating to the movable range of the connecting unit 106 through which the serial signal path 136 passes can be said to be very much greater than that of the connecting unit 106 through which the parallel signal path 112 passes. At the same time, it can also be said that the reliability of the serial signal path 136 is high. Additionally, a differential signal such as a LVDS or the like is ordinarily used for the serial signal that flows through the serial signal path 136. The LVDS is an abbreviation for Low Voltage Differential Signal.

Heretofore, the device configuration of the mobile terminal 130 has been briefly described. The overall device configuration of the mobile terminal 130 adopting the serial transmission scheme is approximately as described above. However, how much the number of signal lines in the connecting unit 106 can be reduced depends on the form of the signal flowing through the serial signal path 136. The serializer 134 and the deserializer 138 are to determine the form of this signal. In the following, functional configurations of the serializer 134 and the deserializer 138 in a general serial transmission scheme will be briefly described. Afterwards, functional configurations of the serializer 134 and the deserializer 138 according to the above-described new scheme will be described.

(General Configuration)

Figure 3:
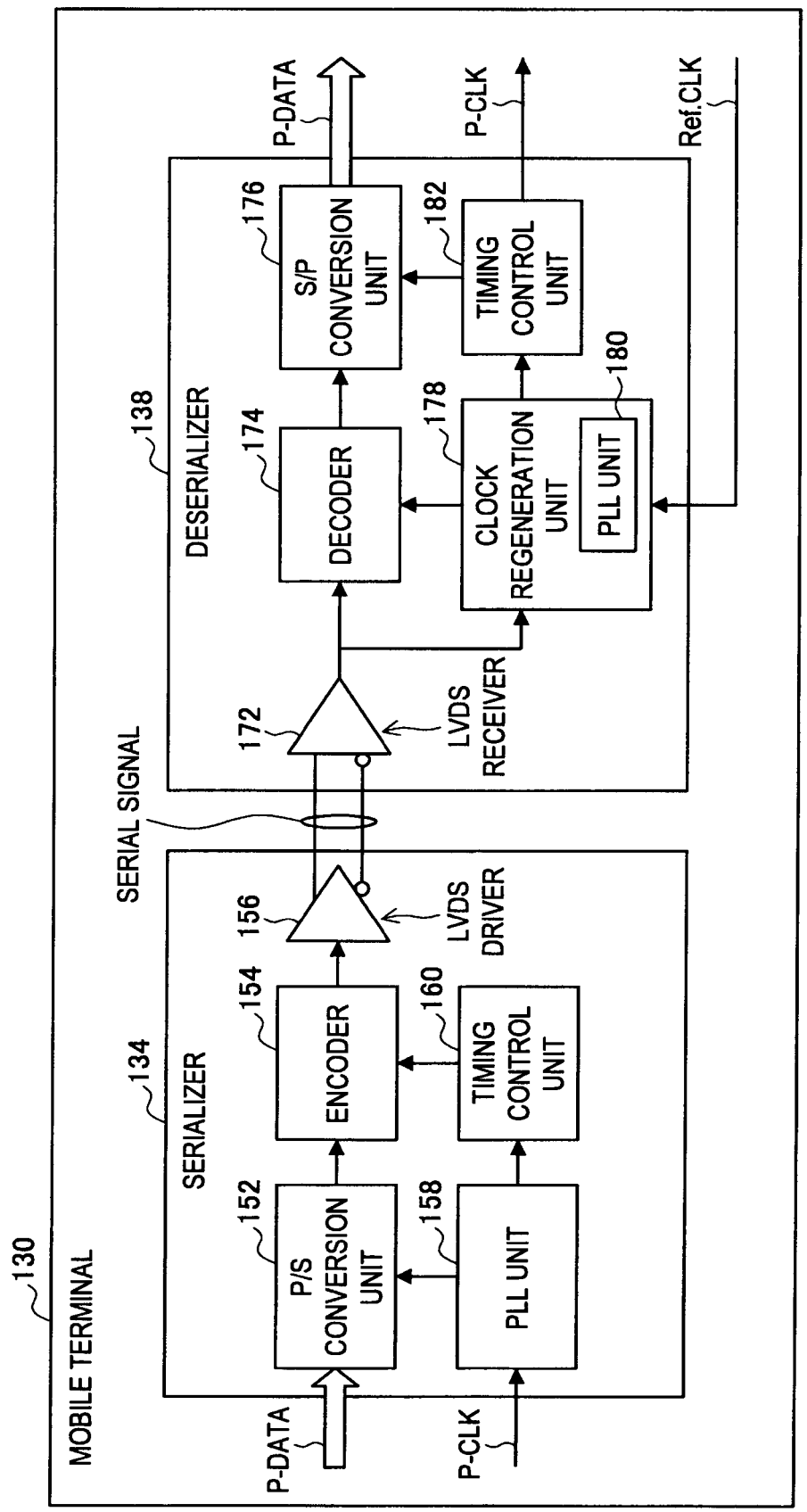
FIG. 3 is an explanatory diagram showing a functional configuration example relating to internal data transmission of the mobile terminal according to the serial transmission scheme.

Here, a functional configuration of the mobile terminal 130 adopting a general serial transmission scheme will be described with reference to FIG. 3. FIG. 3 is an explanatory diagram showing a functional configuration example of the mobile terminal 130 adopting a general serial transmission scheme. However, it should be noted that FIG. 3 is an explanatory diagram mainly illustrating the functional configurations of the serializer 134 and the deserializer 138, and that description of other structural elements are omitted.

(Serializer 134)

As shown in FIG. 3, the serializer 134 includes a P/S conversion unit 152, an encoder 154, an LVDS driver 156, a PLL unit 158, and a timing control unit 160.

As shown in FIG. 3, the parallel signal (P-DATA) and a parallel signal clock (P-CLK) are input from the baseband processor 110 to the serializer 134. The parallel signal that is input to the serializer 134 is converted into a serial signal by the P/S conversion unit 152. The serial signal that has been converted by the P/S conversion unit 152 is input to the encoder 154. The encoder 154 adds a header and the like to the serial signal and inputs it to the LVDS driver 156. The LVDS driver 156 transmits the input serial signal to the deserializer 138 by a differential transmission scheme according to LVDS.

In contrast, the parallel signal clock that is input to the serializer 134 is input to the PLL unit 158. The PLL unit 158 generates a serial signal clock from the parallel signal clock and inputs it to the P/S conversion unit 152 and to the timing control unit 160. The timing control unit 160 controls the timing of the transmission of the serial signal by the encoder 154, based on the serial signal clock that is input.

(Deserializer 138)

Furthermore, as shown in FIG. 3, the deserializer 138 mainly includes an LVDS receiver 172, a decoder 174, an S/P conversion unit 176, a clock regeneration unit 178, a PLL unit 180, and a timing control unit 182.

As shown in FIG. 3, the serial signal is transmitted to the deserializer 138 from the serializer 134 by the differential transmission scheme according to LVDS. The serial signal is received by the LVDS receiver 172. The serial signal that is received by the LVDS receiver 172 is input to the decoder 174 and to the clock regeneration unit 178. The decoder 174 detects the beginning portion of the data by referring to the header of the input serial signal and inputs the signal to the S/P conversion unit 176. The S/P conversion unit 176 converts the input serial signal into the parallel signal (P-DATA). The parallel signal that has been converted by the S/P conversion unit 176 is output to the liquid crystal unit 104.

For its part, the clock regeneration unit 178 uses the built-in PLL unit 180 to regenerate the parallel signal clock from the serial signal clock by referring to a reference clock (Ref. CLK) that is input from the outside. The parallel signal clock that has been regenerated by the clock regeneration unit 178 is input to the decoder 174 and to the timing control unit 182. The timing control unit 182 controls the receiving timing based on the parallel signal clock that is input from the clock regeneration unit 178. The parallel signal clock (P-CLK) that is input to the timing control unit 182 is output to the liquid crystal unit 104.

In this manner, the parallel signal (P-DATA) and the parallel signal clock (P-CLK) that are input to the serializer 134 from the baseband processor 110 are converted into the serial signals and are transmitted to the deserializer 138. The input serial signals are then restored by the deserializer 138 to the original parallel signal and parallel signal clock. The parallel signal and the parallel signal clock that have been restored are input to the liquid crystal unit 104. In case the parallel signal is an image signal, an image is displayed by the liquid crystal unit 104 based on the input parallel signal.

Heretofore, a general functional configuration of the mobile terminal 130 adopting the serial transmission scheme has been described. As described above, the transmission line is serialized by converting the parallel signal into the serial signal and transmitting the serial signal. The range of movement of the portion through which the serial signal path passes is enlarged as a result, and the degree of freedom in the disposition of the display unit 102 is increased. Therefore, in a case where the mobile terminal 130 is used to watch and listen to a television broadcast or the like, for example, it is possible to transform the mobile terminal 130 such that the display unit 102 is disposed in a landscape orientation from the user's point of view. The increase in the degree of freedom brings with it a wider range of uses for the mobile terminal 130, such that, in the addition of various types of communication terminal functions, a wide variety of uses becomes possible, such as watching videos, listening to music, and the like.

Additionally, the above example describes a method of serializing a data signal such as an image signal and transmitting the same. In addition to the transmission line for the data signal, at least a power line is provided in the connecting unit 106 of the mobile terminal 130. Break in the power line will cause a serious damage, and thus, it is extremely important to improve its reliability. Also, the restriction imposed on the range of movement of the connecting unit 106 greatly differs for a case where the number of the transmission lines is 1 and for a case where it is 2 or more. Thus, a scheme has been devised according to which the data signal is transmitted being superimposed on a power signal.

This scheme is for encoding the data signal into a code form that does not include a DC component, such as an AMI code (see FIG. 4) and a Manchester code, and transmitting the data signal by superimposing the same on a power signal. Using this method will enable to reduce the number of the transmission lines in the connecting unit 106 by the number of the power lines.

(Summary of Issues 1)

As explained above, a parallel transmission scheme like that of the mobile terminal 100 that is described above is not well suited to freely change the positional relationship of the operation unit 108 and the display unit 102. Accordingly, a method has been proposed to provide the serializer 134 and the deserializer 138, as in the mobile terminal 130 that is described above, to make serial transmission possible and increase the range of movement of the display unit 102. Also, to further improve the movability of the display unit 102, a scheme has been proposed to superimpose a signal on the power line and transmit the signal, by taking the advantage of the characteristics of a code not including a DC component.

However, as shown in FIG. 3, the PLL unit 180 (hereinafter, PLL) is used in the mobile terminal 130 to regenerate the clock of a received serial signal. This PLL is necessary to extract a clock from a signal which is encoded according to the Manchester encoding scheme or the like. However, the amount of power consumption of the PLL itself is not small. Thus, providing the PLL will increase the power consumption of the mobile terminal 130 by the amount of the power consumption by the PLL. Such increase in the amount of the power consumption will be a grave issue for a small device such as a mobile phone and the like.

In view of such issue, the inventor of the present invention has devised a novel transmission scheme (new scheme) of transmitting a signal which does not include a DC component and which is transmitted by using a code for which a PLL circuit is not necessary at the time of clock regeneration, so that a PLL will not be necessary at the deserializer 138. Hereunder, this new scheme will be described. Additionally, although, in the following explanation, an encoding method according to the new scheme for which the AMI code serves as a base will be taken as the concrete example, the application target of the new scheme is not limited to the AMI code.

(1-3: Functional Configuration of Mobile Terminal 130 according to New Scheme)

First, the AMI code will be briefly described, and then, the functional configuration of the mobile terminal 130 according to the new scheme and the encoding method of such mobile terminal 130 will be described.

(Signal Waveform of AMI Code)

Figure 4:
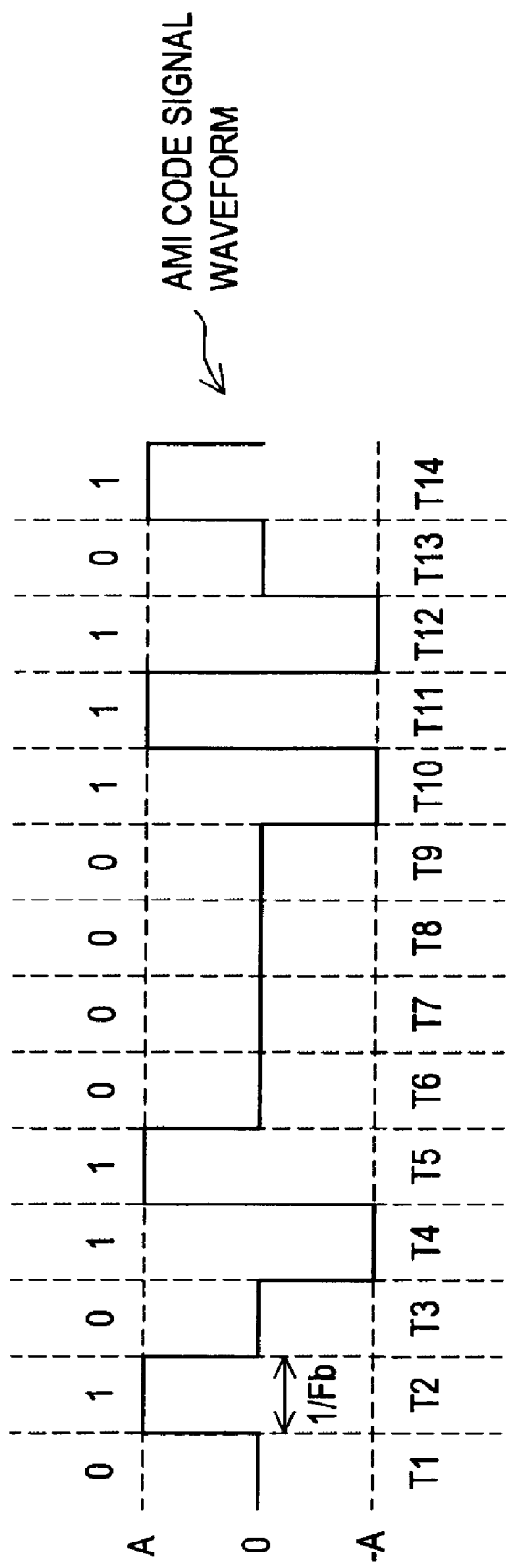
FIG. 4 is an explanatory diagram showing an example of a signal waveform of an AMI code.

First, the signal waveform of the AMI code and its characteristics will be briefly described with reference to FIG. 4. FIG. 4 is an explanatory diagram showing an example of the signal waveform of the AMI code. In the following explanation, it is assumed that A is any positive number.

The AMI code is a code that uses an electrical potential of zero to express a data value of zero and potentials of A and −A to express a data value of 1. Note, however, that the potential A and the potential −A are used alternately. That is, after a data value of 1 has been expressed by the potential A, if the next data value is also a 1, that 1 will be expressed by the potential −A. Because the data values are expressed by repeatedly inverting the polarity in this manner, the AMI code does not contain a DC component.

Other codes with the same type of characteristics as the AMI code include, for example, the partial response scheme that expresses the data as PR (1, −1), PR (1, 0, −1), PR (1, 0, . . . , −1), and the like. Transmission codes that use this sort of polarity inversion are called bipolar codes. Alternatively, a dicoding scheme or the like can also be used for the encoding method of the new scheme. In the following explanation, an encoding method which uses an AMI code with a duty of 100% will be described as an example.

FIG. 4 schematically shows the AMI code of periods T1 to T14. In the drawing, a data value 1 appears at timings T2, T4, T5, T10, T11, T12, and T14. If the potential is A at timing T2, the potential at timing T4 is −A. Also, the potential at timing T5 is A. As such, the amplitude corresponding to the data value 1 is alternately inverted between positive and negative values. This is the polarity inversion that is described above.

In contrast, a data value 0 is expressed by a potential 0 at all times. This form of expression allows the AMI code to not include a DC component. However, as can be seen at timings T6 to T9, it sometimes results in consecutive potentials of 0.

The consecutive potentials of 0 make it difficult to extract the clock component from the signal waveform without using a PLL. Accordingly, the inventor of the present invention has devised, as the new scheme, a method of superimposing a clock on the AMI code (or a code having equivalent characteristics) before transmitting the same. This method will be described later in detail.

(Functional Configuration of Mobile Terminal 130)

Figure 5:
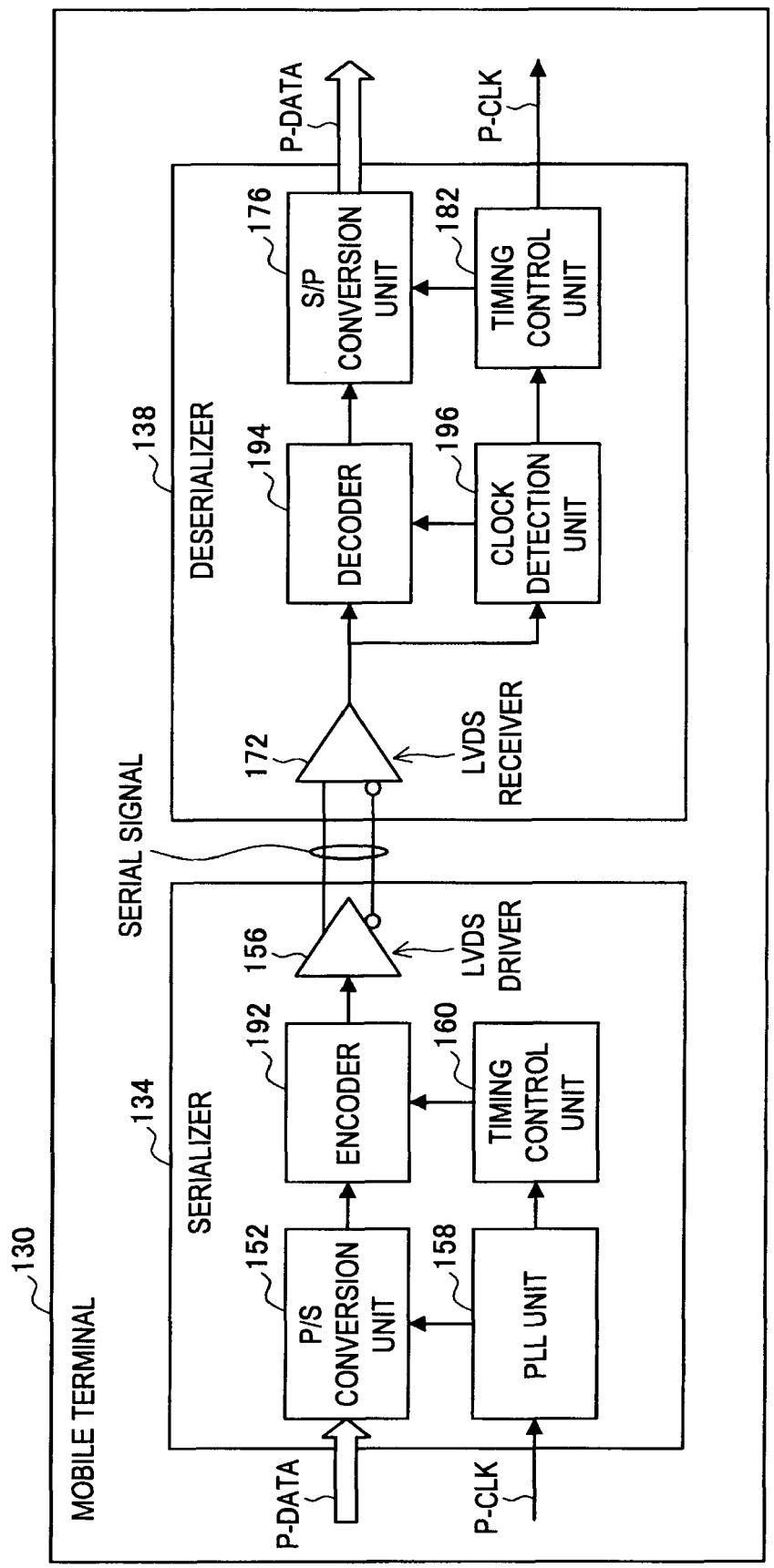
FIG. 5 is an explanatory diagram showing a functional configuration example relating to internal data transmission of the mobile terminal according to the new scheme.

Hereunder, the functional configuration of the mobile terminal 130 according to the new scheme will be described with reference to FIG. 5. FIG. 5 is an explanatory diagram showing an example of the functional configuration of the mobile terminal 130 according to the new scheme. However, it should be noted that FIG. 5 is an explanatory diagram mainly illustrating the functional configurations of the serializer 134 and the deserializer 138, and that description of other structural elements are omitted. Also, detailed description of the structural elements of the mobile terminal 130 already described are omitted.

(Serializer 134)

First, the serializer 134 will be described. As shown in FIG. 5, the serializer 134 is configured from the P/S conversion unit 152, the LVDS driver 156, the PLL unit 158, the timing control unit 160, and an encoder 192. The main point of difference from the general configuration described earlier is in the function of the encoder 192.

As shown in FIG. 5, the parallel signal (P-DATA) and the parallel signal clock (P-CLK) are input from the baseband processor 110 to the serializer 134. The parallel signal that is input to the serializer 134 is converted into a serial signal by the P/S conversion unit 152. The serial signal that has been converted by the P/S conversion unit 152 is input to the encoder 192. The encoder 192 adds a header and the like to the serial signal and generates a transmission frame. Furthermore, the encoder 192 encodes the generated transmission frame by the encoding method of the new scheme described later, and generates a transmission signal.

Figure 6:
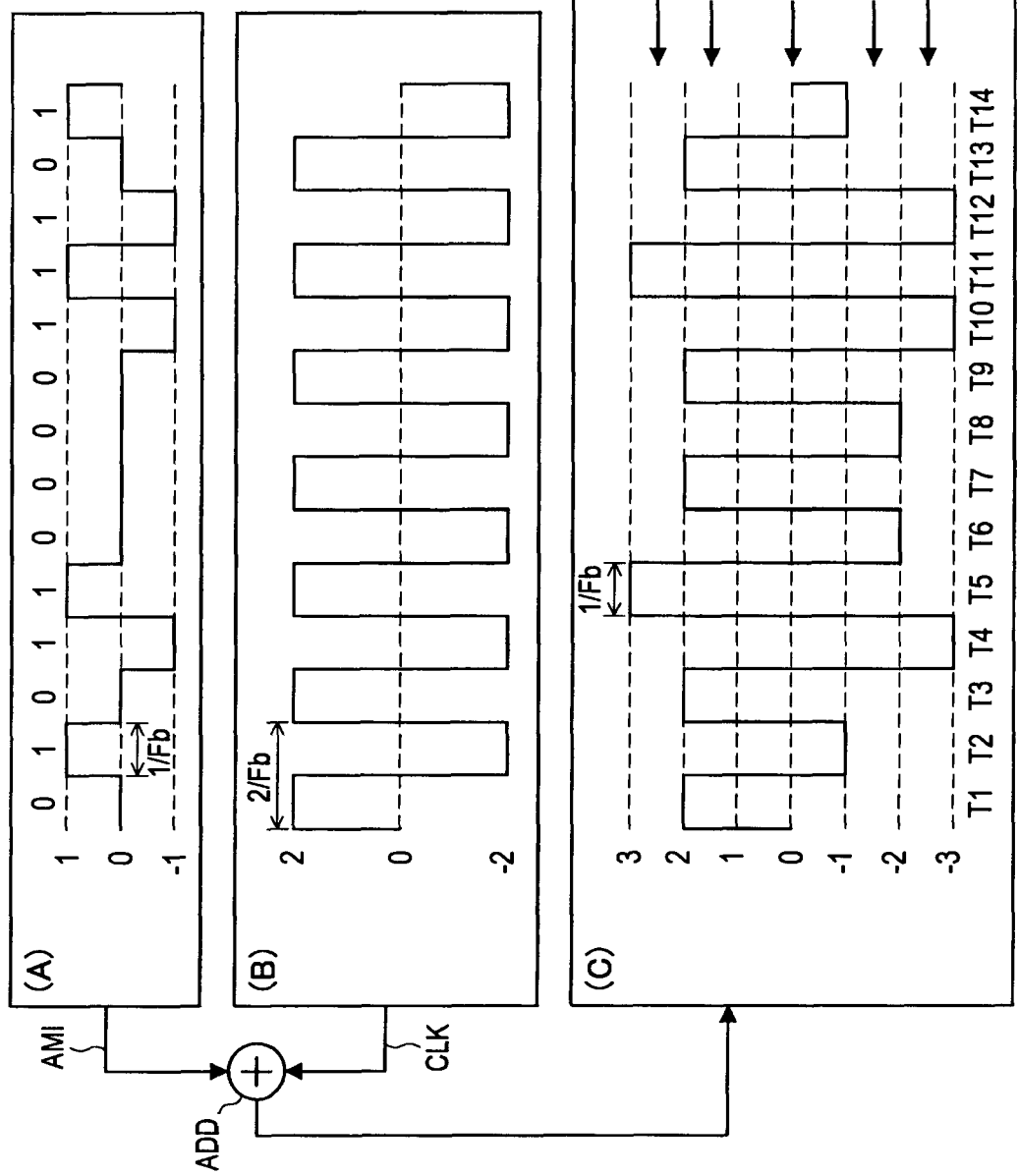
FIG. 6 is an explanatory diagram showing an encoding method according to the new scheme.

Next, a method of generating the encoded signal by the encoder 192 will be described with reference to FIG. 6. FIG. 6 is an explanatory diagram showing an example of the encoding method of the new scheme. Additionally, FIG. 6 illustrates a method of generating a code for which the AMI code serves as a base. However, the new scheme is not limited to such, and it can be applied to any code having the same characteristics as the AMI code. For example, it can be applied to a bipolar code, a code according to a partial response scheme, and the like.

The signal that is shown in (C) of FIG. 6 is a signal that has been encoded by the encoding method of the new scheme. In this signal, data values 1 are expressed by a plurality of potentials A1 (−1, −3, 1, 3) and data values 0 are expressed by a plurality of potentials A2 (−2, 2) that are different from the potentials A1. Additionally, this signal is configured such that the polarities are inverted and also such that the same potential does not occur consecutively. For example, referring to the section where data values 0 occur consecutively in timings T6 to T9, the potentials are −2, 2, −2, 2. Using this sort of code makes it possible to regenerate the clock component by detecting both the rising and the falling edges, even if the same data value occurs consecutively.

Because the encoder 192 generates a code as described above, it is provided with an adder ADD. As shown in FIG. 6, the encoder 192, for example, encodes a serial signal that is input into an AMI code (A), and inputs the AMI code to the adder ADD. Furthermore, the encoder 192 generates a clock (B) having a frequency (2/Fb) half that of the transmission speed Fb of the AMI code, and inputs the clock to the adder ADD. Here, the amplitude of the clock is N times that of the AMI code (N>1; N=2 in the example in FIG. 6). The encoder 192 then adds the AMI code and the clock by using the adder ADD, and generates a code (C). At this time, the AMI code and the clock are synchronously added with their edges aligned.

The amplitude level of the code (C) obtained by synchronously adding the AMI code (A) and the clock (B) may take six values, i.e. 3, 2, 1, −1, −2, and −3, in the example showing in FIG. 6. That is, the transmission signal is a multilevel signal having six amplitude levels. Thus, the ranges of the amplitude levels of the transmission signal become wider compared to a case of transmitting the AMI code (A) as it is, and the transmission error becomes more likely to occur. This point will be described later in detail. Additionally, a configuration of synchronously adding the AMI code (A) and the clock (B) has been described here for the sake of simplicity of the explanation. However, the encoder 192 may be configured such that data is directly encoded into the waveform of the code (C). For example, in the case of FIG. 6, data sequence 0, 1, 0, 1, 1, 0, ..., 1 may be directly converted into amplitude levels 2, −1, 2, −3, 3, −2, ..., −1 by the encoder 192.

FIG. 5 will be again referred to. The serial signal that has been encoded by the encoder 192 in the manner described above is input to the LVDS driver 156. The LVDS driver 156 transmits the input serial signal to the deserializer 138 by a differential transmission scheme according to LVDS. On the other hand, a parallel signal clock input to the serializer 134 is input to the PLL unit 158. The PLL unit 158 generates a serial signal clock from the parallel signal clock, and inputs the serial signal clock to the P/S conversion unit 152 and the timing control unit 160. The timing control unit 160 controls the timing of the transmission of the serial signal by the encoder 192, based on the input serial signal clock. As described above, a serial signal is encoded and transmitted from the serializer 134 to the deserializer 138.

(Deserializer 138)

Next, the deserializer 138 will be described. As shown in FIG. 5, the deserializer 138 is mainly configured from the LVDS receiver 172, the S/P conversion unit 176, the timing control unit 182, a clock detection unit 196, and a decoder 194. The main point of difference from the general configuration described above is in the presence of the clock detection unit 196, which does not have a PLL.

As described above, the serial signal is transmitted from the serializer 134 to the deserializer 138 by the differential transmission scheme according to LVDS. The serial signal is received by the LVDS receiver 172. The serial signal received by the LVDS receiver 172 is input to the decoder 194 and the clock detection unit 196. The decoder 194 detects the beginning portion of the data by referring to the header of the input serial signal and decodes the serial signal that was encoded according to the encoding scheme used by the encoder 192.

Next, a method of decoding by the decoder 194 will be described by referring again to FIG. 6. As described above, the serial signal is encoded by the encoder 192 into a signal waveform of the code (C) having six amplitude levels. Thus, the decoder 194 can decode the original signal by performing threshold determination of determining whether the amplitude level of the received signal is A1 or A2. For example, four threshold values (L1, L2, L3, L4) that are shown in (C) in FIG. 6 are used to distinguish between amplitude level A1 (−1, −3, 1, 3), which corresponds to data value 1, and amplitude level A2 (−2, 2), which corresponds to data value 0. The decoder 194 first compares the amplitude level of the input signal to the four threshold values described above and determines whether the amplitude level is A1 or A2. Then, the decoder 194 decodes the original NRZ data based on the determination result and restores the serial signal that was transmitted.

FIG. 5 will be again referred to. The serial signal that has been decoded by the decoder 194 is input to the S/P conversion unit 176. The S/P conversion unit 176 converts the input serial signal into the parallel signal (P-DATA). The parallel signal that has been converted by the S/P conversion unit 176 is input to the liquid crystal unit 104. In case the parallel signal is an image signal, an image is displayed by the liquid crystal unit 104 based on the image signal.

Now, a clock becomes necessary to perform the above-described decoding process. Accordingly, the clock detection unit 196 detects the clock component in the signal input from the LVDS receiver 172. As has already been explained, the code (C) in FIG. 6 is obtained by synchronously adding the code (A) and the clock (B). Thus, this code (C) has a characteristic that the polarity is inverted every half cycle of the clock. When using this characteristic, the clock component is obtained by comparing the amplitude level and threshold level L0 (potential 0) and detecting the polarity inversion cycle of the amplitude. As a result, the clock detection unit 196 does not have to use a PLL at the time of detecting the clock component. Accordingly, a PLL does not have to be provided, and the power consumption and the circuit scale of the deserializer 138 can be reduced to that extent.

Now, the clock component detected by the clock detection unit 196 is input to the decoder 194 and the timing control unit 182. The clock component input to the decoder 194 is used at the time of performing an NRZ data decoding process according to the amplitude level determination for a multilevel code. Furthermore, the timing control unit 182 controls a reception timing based on the clock input from the clock detection unit 196. The clock (P-CLK) input to the timing control unit 182 is output to the liquid crystal unit 104.

The threshold determination performed by the decoder 194 and the clock detection unit 196 described above is realized by using a comparator, for example. The clock component is extracted at the clock detection unit 196 from the output result of a comparator in which threshold value is amplitude level 0. In contrast, the decoder 194 uses a comparator with four threshold levels, i.e. 2.5, 1.5, −1.5, and −2.5, to determine six amplitude levels, i.e. 3, 2, 1, −1, −2, and −3, for example. An amplitude level corresponding to each timing is determined based on the output results of these comparators. Also, the original NRZ data is decoded based on the determination result.

As described above, using a code which does not include a DC component and from which a clock component can be regenerated based on the polarity inversion cycle allows the deserializer 138 to perform clock detection without using a PLL, and thus, the power consumption of the mobile terminal 130 can be greatly reduced. Additionally, the above-described example illustrates a differential transmission scheme according to LVDS. However, a power superimposition scheme for superimposing a multilevel signal on a DC power signal and transmitting the same can also be used. According to this configuration, the range of movement of the connecting unit 106 can be further increased.

(Summary of Issues 2)

Heretofore, the functional configuration of the mobile terminal 130 according to the new scheme and the encoding/decoding method have been described. As described above, by using the encoding method according to the new scheme, the number of lines in the connecting unit 106 is greatly reduced, and also, significant effects such as reduction in the circuit scale and reduction in the power consumption amount can be obtained. As such, the technology of the new scheme is suitably used for a small electronic device for which power saving is especially desired, such as the mobile terminal 130. As described above, the technology of the new scheme aims to save power by allowing to omit some circuit with relatively high power consumption.

On the other hand, a method can also be conceived which aims to save power by appropriately controlling the operation of some circuit with relatively high power consumption. For example, the serializer 134 and the deserializer 138 of the mobile terminal 130 are hardly used during a time when data transmission is not performed, and thus, adoption of a sleep mode where the operation of some or all the circuits included in these structural elements is in a standby state will greatly contribute to power saving. Hereunder, a method of saving power by such operation control of some circuit will be concretely described.

(1-4: Configuration Example of Interface Circuit Provided With Mode Switching Function)

Heretofore, the configuration of the mobile terminal 130 having the serializer 134 and the deserializer 138 has been described. However, the application scope of the technology according to the new scheme described above is not necessarily limited the mobile terminal 130. More broadly, the technology of the new scheme can be applied to any electronic device which includes a master device corresponding to the serializer 134 and a slave device corresponding to the deserializer 138 and which transmits data between the master and the slave. That is, an example of such electronic device is the mobile terminal 130 described above. Thus, in the following explanation, a method of transmitting data between the master device and the slave device will be considered while using a more generalized expression.

Here, a method of saving power by appropriately controlling the operation of some circuit with relatively high power consumption will be described. Particularly, a method of appropriately switching the operation mode of some circuit and a configuration example of an interface circuit 200 capable of realizing the switching method will be described with reference to FIGS. 7 and 8. FIG. 7 is an explanatory diagram showing a configuration example of a master device of the interface circuit 200. In contrast, FIG. 8 is an explanatory diagram showing a configuration example of a slave device of the interface circuit 200. Additionally, the master device shown in FIG. 7 and the slave device shown in FIG. 8 are connected via an interface 208.

(Master Device)

First, a circuit configuration example of a master device capable of controlling the switching of the operation mode will be described with reference to FIG. 7. Additionally, an explanation will be given here for a flow of the master/slave transitioning to a sleep mode and then returning again to a normal mode. The sleep mode means a power saving mode where the operation of some circuit is in a standby state. Also, the normal mode means a mode where all the circuits are placed in an operation state and where high speed data transmission is enabled.

Figure 7:
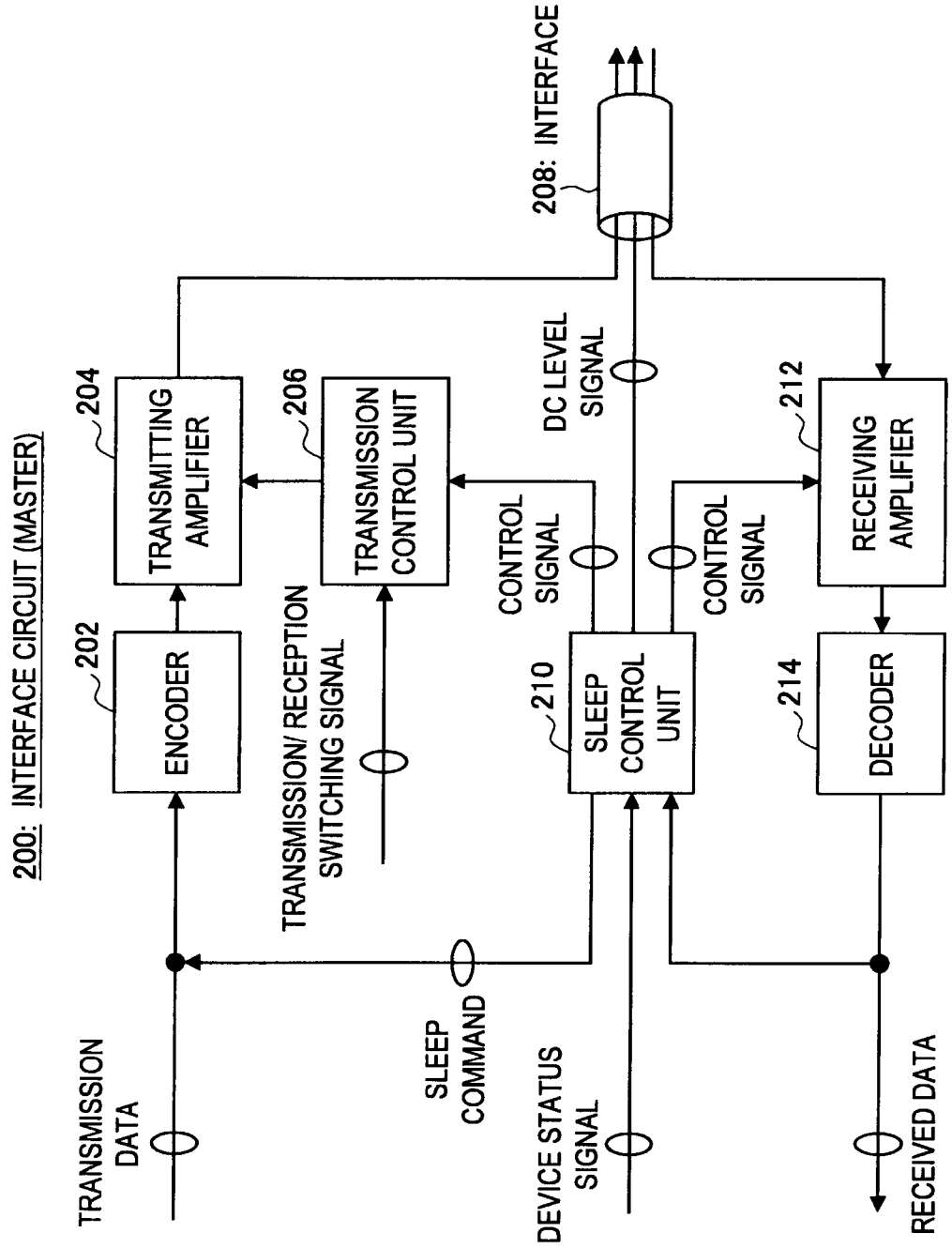
FIG. 7 is an explanatory diagram showing a configuration example of an interface circuit provided with a mode switching control function of an electronic device such as a mobile terminal (master)

As shown in FIG. 7, the master device includes an encoder 202, a transmitting amplifier 204, a transmission control unit 206, a sleep control unit 210, a receiving amplifier 212, and a decoder 214. The master device is connected to the slave device via the interface 208.

First, when transmission data is input to the master device of the interface circuit 200, the transmission data is input to the encoder 202. At the encoder 202, an encoding process based on a specific encoding scheme is performed on the transmission data, and the transmission data is converted into encoded data. The encoded data output from the encoder 202 is input to the transmitting amplifier 204. At the transmitting amplifier 204, the encoded data input from the encoder 202 is amplified to a specific signal level. The encoded data amplified by the transmitting amplifier 204 is transmitted to the slave device via the interface 208.

Furthermore, encoded data is transmitted to the master device from the slave device via the interface 208. The encoded data received via the interface 208 is input to the receiving amplifier 212. At the receiving amplifier 212, the encoded data is amplified to a specific signal level. The encoded data amplified by the receiving amplifier 212 is input to the decoder 214. At the decoder 214, a decoding process based on a specific encoding scheme is performed on the encoded data input from the receiving amplifier 212, and the encoded data is converted into received data. The received data output from the decoder 214 is output to other structural elements of the master device.

As described above, the master device encodes and transmits transmission data to the slave device, and also, decodes encoded data received from the slave device and acquires received data. The interface circuit 200 performs such data transmission in the normal mode. However, when data transmission is not performed, the structural elements related to the data transmission are hardly operated. Thus, in the sleep mode, a part of these structural elements is transitioned to a standby state. The main structural element controlling the transition from the normal mode to the sleep mode is the sleep control unit 210. Thus, a process of transition between the normal mode and the sleep mode will be described, focusing on the operation of the sleep control unit 210.

As described above, the sleep control unit 210 is a circuit for transitioning the operation mode of the master device from the normal mode to the sleep mode or for returning the operation mode to the normal mode from the sleep mode. In case of transitioning from the normal mode to the sleep mode, the sleep control unit 210 generates a sleep command packet, and inputs the same to the encoder 202. Also, the sleep control unit 210 inputs a disable signal to the transmission control unit 206. The disable signal is a control signal for switching a circuit to a standby state. Also, an enable signal is a control signal for switching a circuit to an operation state.

As described above, at the time of transition to the sleep mode, the sleep command packet is input to the encoder 202. When the sleep command packet is input, the encoder 202 encodes the sleep command packet, and generates encoded data. The encoded data output from the encoder 202 is input to the transmitting amplifier 204. At the transmitting amplifier 204, the encoded data input from the encoder 202 is amplified to a specific signal level. The encoded data amplified by the transmitting amplifier 204 is transmitted to the slave device via the interface 208.

Also, at the time of transition to the sleep mode, the disable signal is input to the transmission control unit 206 from the sleep control unit 210, and furthermore, a transmission/reception switching signal for switching between a transmission state and a reception state is input to the transmission control unit 206 in addition to the disable signal. The transmission control unit 206 places, according to the input of the transmission/reception switching signal, the transmitting amplifier 204 in an operation state in case of the transmission state and places the transmitting amplifier 204 in a standby state in case of the reception state. Also, when the disable signal is input in the transmission state, the transmission control unit 206 places the transmitting amplifier 204 in a standby state. On the other hand, when the disable signal is input in the reception state, the transmission control unit 206 keeps the transmitting amplifier 204 in the standby state.

As described above, the sleep command packet is transmitted to the slave device at the time of transition to the sleep mode. If the sleep command packet transmitted to the slave device is properly received, encoded data including an ACK (ACKnowledgement) packet is transmitted to the master device from the slave device. The encoded data received via the interface 208 is input to the receiving amplifier 212. The encoded data is amplified to a specific signal level at the receiving amplifier 212.

The encoded data amplified by the receiving amplifier 212 is input to the decoder 214. At the decoder 214, a decoding process based on a specific encoding scheme is performed on the encoded data input from the receiving amplifier 212, and the encoded data is converted into an ACK packet. The ACK packet output from the decoder 214 is input to the sleep control unit 210. When the ACK packet is input from the decoder 214, the sleep control unit 210 supplies a DC level to the interface 208. Furthermore, the sleep control unit 210 inputs the disable signal to the receiving amplifier 212, and switches the operation of the receiving amplifier 212 to a standby state.

Additionally, when returning from the sleep mode to the normal mode, the sleep control unit 210 notifies the slave device of the switching of the operation mode by changing the DC level the sleep control unit 210 is supplying. Also, the sleep control unit 210 inputs the enable signal to the transmission control unit 206, and switches the transmitting amplifier 204 to an operable state. Furthermore, the sleep control unit 210 inputs the enable signal to the receiving amplifier 212, and switches the receiving amplifier 212 to the operation state The operation mode of the master device is returned to the normal mode by these switching processes.

As described above, when transitioning from the normal mode to the sleep mode, the master device transmits the sleep command packet to the slave device, and also, stops the operation of the transmitting amplifier 204. Additionally, the transition process from the normal mode to the sleep mode is started according to a device status signal input to the sleep control unit 210, for example. The device status signal here is issued in case a user input does not occur for a specific period of time, in case an operation mode switching button to the sleep mode is pressed, in case the shape of the electronic device is changed to a specific shape, or in case a specific condition set by a user is met. The power consumption is suppressed by the operation of the transmitting amplifier 204 being stopped in this manner.

(Slave Device)

Next, a circuit configuration example of the slave device capable of controlling the switching of the operation mode will be described with reference to FIG. 8. Additionally, an explanation will be given here for a flow of the master/slave transitioning to the sleep mode and then returning again to the normal mode.

Figure 8:
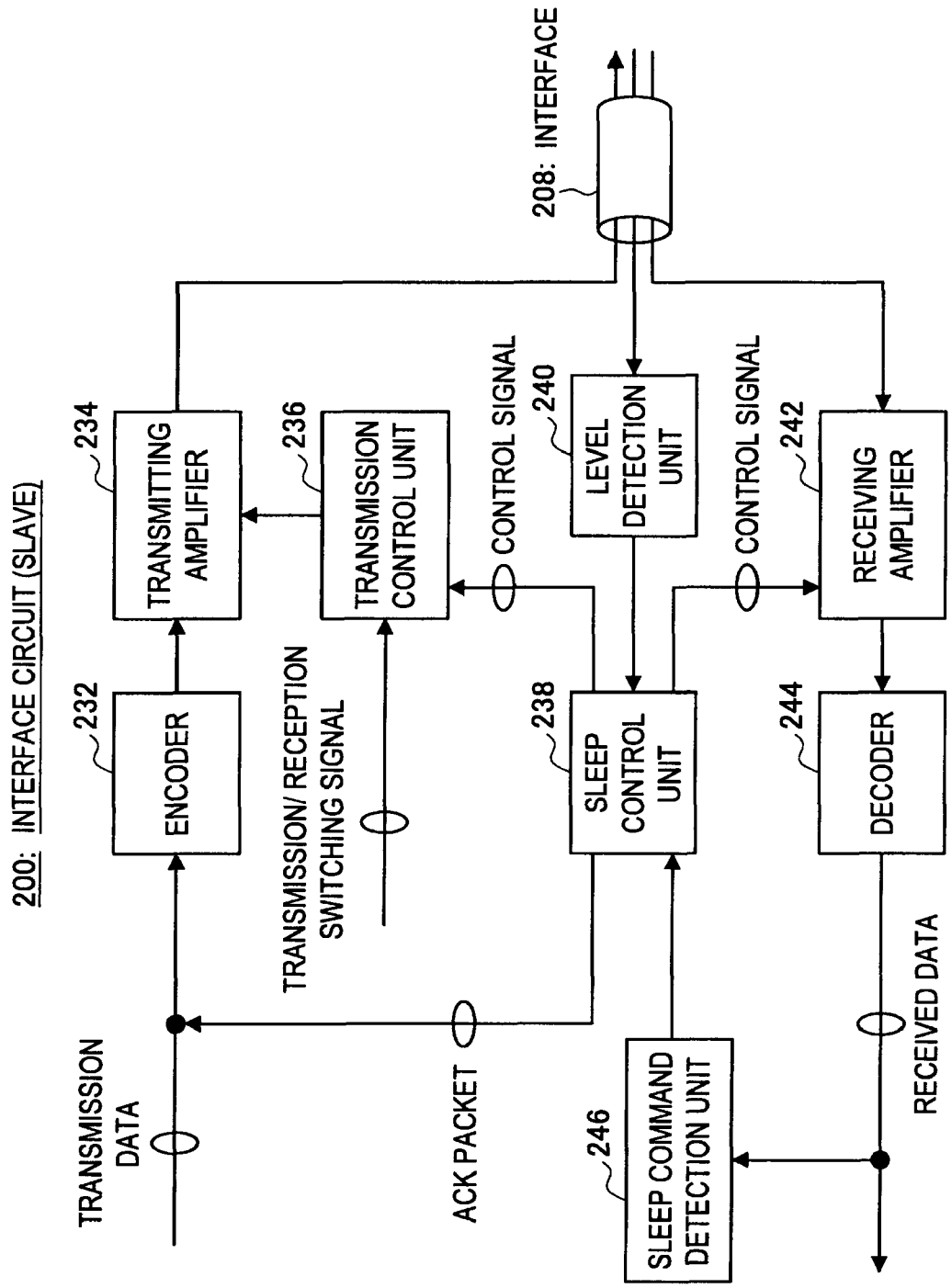
FIG. 8 is an explanatory diagram showing a configuration example of an interface circuit provided with a mode switching control function of an electronic device such as a mobile terminal (slave)

As shown in FIG. 8, the slave device includes an encoder 232, a transmitting amplifier 234, a transmission control unit 236, a sleep control unit 238, a level detection unit 240, a receiving amplifier 242, and a decoder 244. The slave device is connected to the master device via the interface 208.

First, when transmission data is input to the slave device of the interface circuit 200, the transmission data is input to the encoder 232. At the encoder 232, an encoding process based on a specific encoding scheme is performed on the transmission data, and the transmission data is converted into encoded data. The encoded data output from the encoder 232 is input to the transmitting amplifier 234. At the transmitting amplifier 234, the encoded data input from the encoder 232 is amplified to a specific signal level. The encoded data amplified by the transmitting amplifier 234 is transmitted to the master device via the interface 208.

Furthermore, encoded data is transmitted to the slave device from the master device via the interface 208. The encoded data received via the interface 208 is input to the receiving amplifier 242. At the receiving amplifier 242, the encoded data is amplified to a specific signal level. The encoded data amplified by the receiving amplifier 242 is input to the decoder 244. At the decoder 244, a decoding process based on a specific encoding scheme is performed on the encoded data input from the receiving amplifier 242, and the encoded data is converted into received data. The received data output from the decoder 244 is output to other structural elements of the slave device.

As described above, the slave device encodes and transmits transmission data to the master device, and also, decodes encoded data received from the master device and acquires received data. The interface circuit 200 performs such data transmission in the normal mode. However, when data transmission is not performed, the structural elements related to the data transmission hardly operate. Thus, in the sleep mode, a part of these structural elements is transitioned to a standby state. The main structural element controlling the transition from the normal mode to the sleep mode is the sleep control unit 238. Thus, a process of transition between the normal mode and the sleep mode will be described, focusing on the operation of the sleep control unit 238.

The sleep control unit 238 is a circuit for transitioning the operation mode of the slave device from the normal mode to the sleep mode or for returning the operation mode to the normal mode from the sleep mode. The transition process from the normal mode to the sleep mode is started according to a sleep command packet transmitted from the master device. In case of transition from the normal mode to the sleep mode, the sleep control unit 238 generates a sleep ACK packet indicating that the sleep command packet is properly received, and inputs the same to the encoder 232. Also, the sleep control unit 238 inputs a disable signal to the transmission control unit 236.

As described above, at the time of transition to the sleep mode, the sleep ACK packet is input to the encoder 232. When the sleep ACK packet is input, the encoder 232 encodes the sleep ACK packet, and generates encoded data. The encoded data output from the encoder 232 is input to the transmitting amplifier 234. At the transmitting amplifier 234, the encoded data input from the encoder 232 is amplified to a specific signal level. The encoded data amplified by the transmitting amplifier 234 is transmitted to the master device via the interface 208.

Also, at the time of transition to the sleep mode, the disable signal is input to the transmission control unit 236 from the sleep control unit 238, and furthermore, a transmission/reception switching signal for switching between a transmission state and a reception state is input to the transmission control unit 236 in addition to the disable signal. The transmission control unit 236 places, according to the input of the transmission/reception switching signal, the transmitting amplifier 234 in an operation state in case of the transmission state and places the transmitting amplifier 234 in a standby state in case of the reception state. Also, when the disable signal is input in the transmission state, the transmission control unit 236 places the transmitting amplifier 234 in a standby state. On the other hand, when the disable signal is input in the reception state, the transmission control unit 236 keeps the transmitting amplifier 234 in the standby state.

As described above, at the time of transition to the sleep mode, the encoded data obtained by encoding the sleep command packet is transmitted to the slave device from the master device. This encoded data is received by the slave device via the interface 208, and is input to the receiving amplifier 242. The encoded data is amplified to a specific signal level at the receiving amplifier 242.

The encoded data amplified by the receiving amplifier 242 is input to the decoder 244. At the decoder 244, a decoding process based on a specific encoding scheme is performed on the encoded data input from the receiving amplifier 242, and the encoded data is converted into a sleep command packet. The sleep command packet output from the decoder 244 is input to the sleep control unit 238. When the sleep command packet is input from the decoder 244, the sleep control unit 238 inputs, as described above, the disable signal to the transmission control unit 236. Also, the sleep control unit 238 inputs to the encoder 232 an ACK packet indicating that the sleep command packet is properly received. Furthermore, the sleep control unit 238 inputs the disable signal to the receiving amplifier 242, and switches the operation of the receiving amplifier 242 to a standby state.

As described above, at the time of transition to the sleep mode from the normal mode, the slave device receives the sleep command packet from the master device and, in case the sleep command packet is properly received, transmits the ACK packet to the master device. Then, the slave device stops the operation of the transmitting amplifier 234. The power consumption is suppressed by the operation of the transmitting amplifier 234 being stopped in this manner.

On the other hand, the slave device transitions to the normal mode from the sleep mode according to an interface signal transmitted from the master device. The interface signal here is a signal that is transmitted by using a change in the DC level that is supplied from the master device in the sleep mode. As described above, in case of transition to the normal mode from the sleep mode, the master device operates the DC level by the sleep control unit 210. A change in the DC level (interface signal) due to such operation is detected by the level detection unit 240 of the slave device.

The interface signal detected by the level detection unit 240 is input to the sleep control unit 238. When the interface signal is input, the sleep control unit 238 inputs an enable signal to the transmission control unit 236, and switches the transmitting amplifier 234 to an operable state. Furthermore, the sleep control unit 238 inputs an enable signal to the receiving amplifier 242, and switches the receiving amplifier 242 to an operation state. The operation mode of the slave device is returned to the normal mode by these switching processes.

(Summary of Issues 3)

Heretofore, the switching method of the operation mode in the interface circuit 200, and the circuit configuration allowing to realize such switching method have been described. In the interface circuit 200, the transition from the sleep mode to the normal mode is notified to the slave device by the operation on the DC level that is supplied via the interface 208. However, in a system where DC power is supplied via the interface 208, the DC level is cut before reaching the level detection unit 240, and thus the interface signal is not detected.

For example, the encoding scheme according to the new scheme described above is a scheme for converting a code into a multilevel code which includes a data component and a clock component and which does not include a DC component, and for transmitting the same. That is, the multilevel code of the new scheme is DC-free. Thus, the multilevel code of the new scheme is superimposed on the DC power and transmitted with a view to reducing the number of signal lines wired in the connecting unit 106 of the mobile terminal 130. As a result, the DC power is separated at the receiving side, and the DC component is cut from the received signal including the data component and the clock component. For this reason, it is hard to apply the mode switching method described above to the system that uses the encoding scheme according to the new scheme. Accordingly, a further refinement is desired to save power by switching the operation mode while maintaining the significant effect of the technology of the new scheme.

In view of such issue, the inventors of the present invention have devised an operation mode switching method that can be applied to a system adopting the technology according to the new scheme described above. In the following, such operation mode switching method will be concretely described.

2. EMBODIMENT

An embodiment of the present invention will be described. The present embodiment proposes an operation mode switching method that can be applied also to a system according to which it is hard to transmit/receive the interface signal by using a change in the DC level. Hereunder, the operation mode switching method according to the present embodiment and a circuit configuration of an interface circuit 300 capable of realizing the switching method will be described. Additionally, like the interface circuit 200 described above, the interface circuit 300 is a circuit for interfacing the master device and the slave device. Furthermore, it is assumed that broadband receiving means for high-speed data transmission and narrow band receiving means for low-speed data transmission are provided in the interface circuit 300.

(Illustration of Operation Mode)

First, an operation mode assumed in the present embodiment will be illustrated. However, the application scope of the technology according to the present embodiment is, of course, not limited to the examples. In the present embodiment, three modes, i.e. a normal mode, a sleep mode, and a deep sleep mode, are assumed as the operation mode.

The normal mode is an operation mode indicating a state in which high-speed data transmission is enabled. The sleep mode is an operation mode in which the broadband receiving means is disabled, and the narrow band receiving means is enabled. Also, the deep sleep mode is an operation mode in which the broadband receiving means is disabled, the narrow band receiving means is enabled, and clock generation means such as a PLL is disabled.

The broadband receiving means consumes more power than the narrow band receiving means. Accordingly, more power is consumed in the normal mode than in the sleep mode. However, in the sleep mode, since the broadband receiving means is disabled, high-speed data transmission is not possible. Furthermore, in the deep sleep mode, the clock generation means such as a PLL, which is operating in the sleep mode, is disabled, and thus power consumption is reduced than in the sleep mode.

Figure 13:
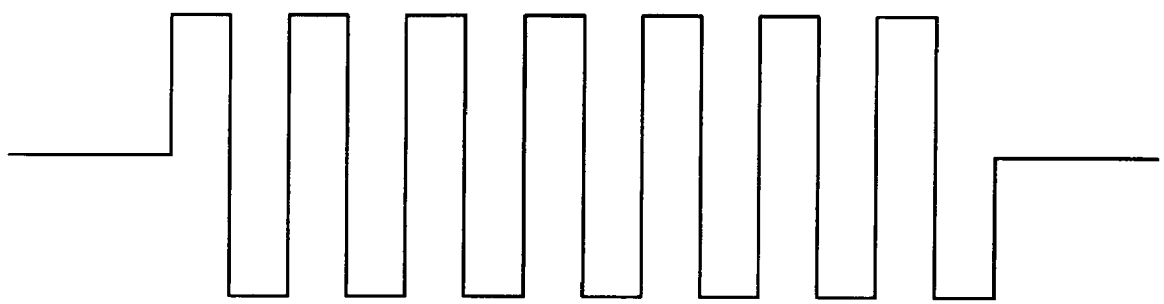
FIG. 13 is an explanatory diagram showing a signal waveform of an activation signal (clock pulse) according to an embodiment of the present invention.
Figure 14:
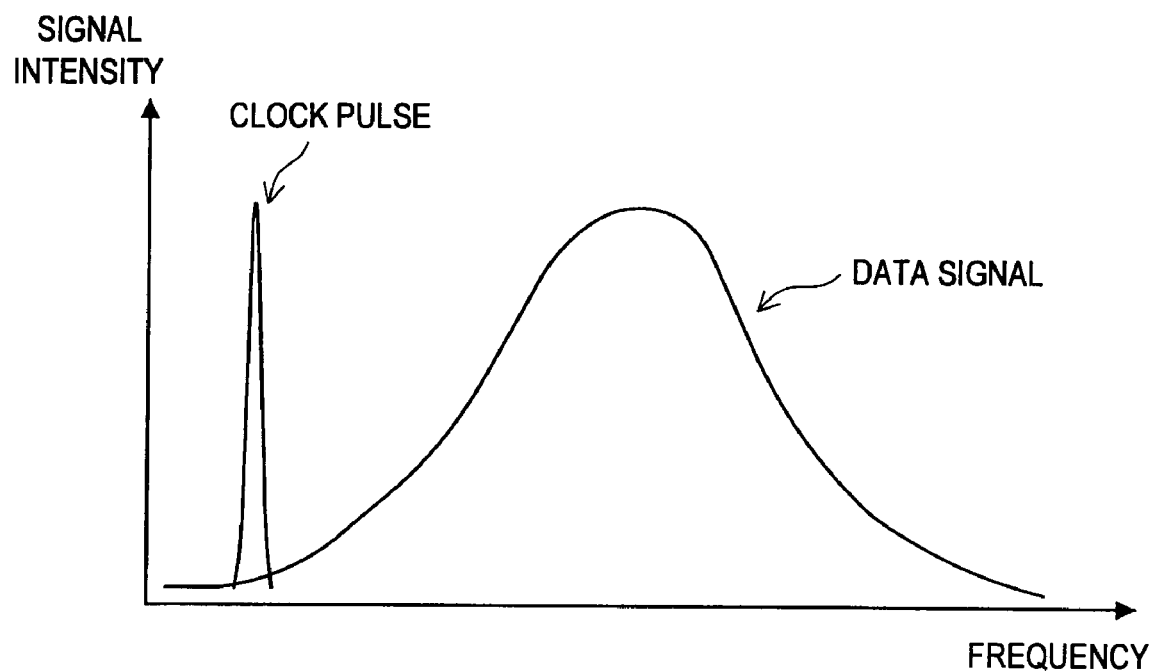
FIG. 14 is an explanatory diagram showing frequency spectra of an activation signal (clock pulse) and a data signal according to an embodiment of the present invention.

The transition from the sleep mode to the normal mode described above is performed by an activation signal being transmitted from the master device to the slave device, for example. The activation signal used in the present embodiment is a clock pulse as shown in FIG. 13. The frequency of this clock pulse is set to be sufficiently lower than the frequency of a data clock (frequency of a data signal) used in the normal mode, as the frequency spectrum shown in FIG. 14. For example, the frequency of the data clock is set to be about 250 MHz, and the frequency of the clock pulse is set to be about 10 MHz. Of course, the frequency of the clock pulse is set to be a value that enables the clock pulse to pass through a DC-blocking transmission line. According to such configuration, the clock pulse can be received even when using a narrow band receiving amplifier.

(2-1: Configuration Example of Interface Circuit Provided with Mode Switching Function)

Figure 9:
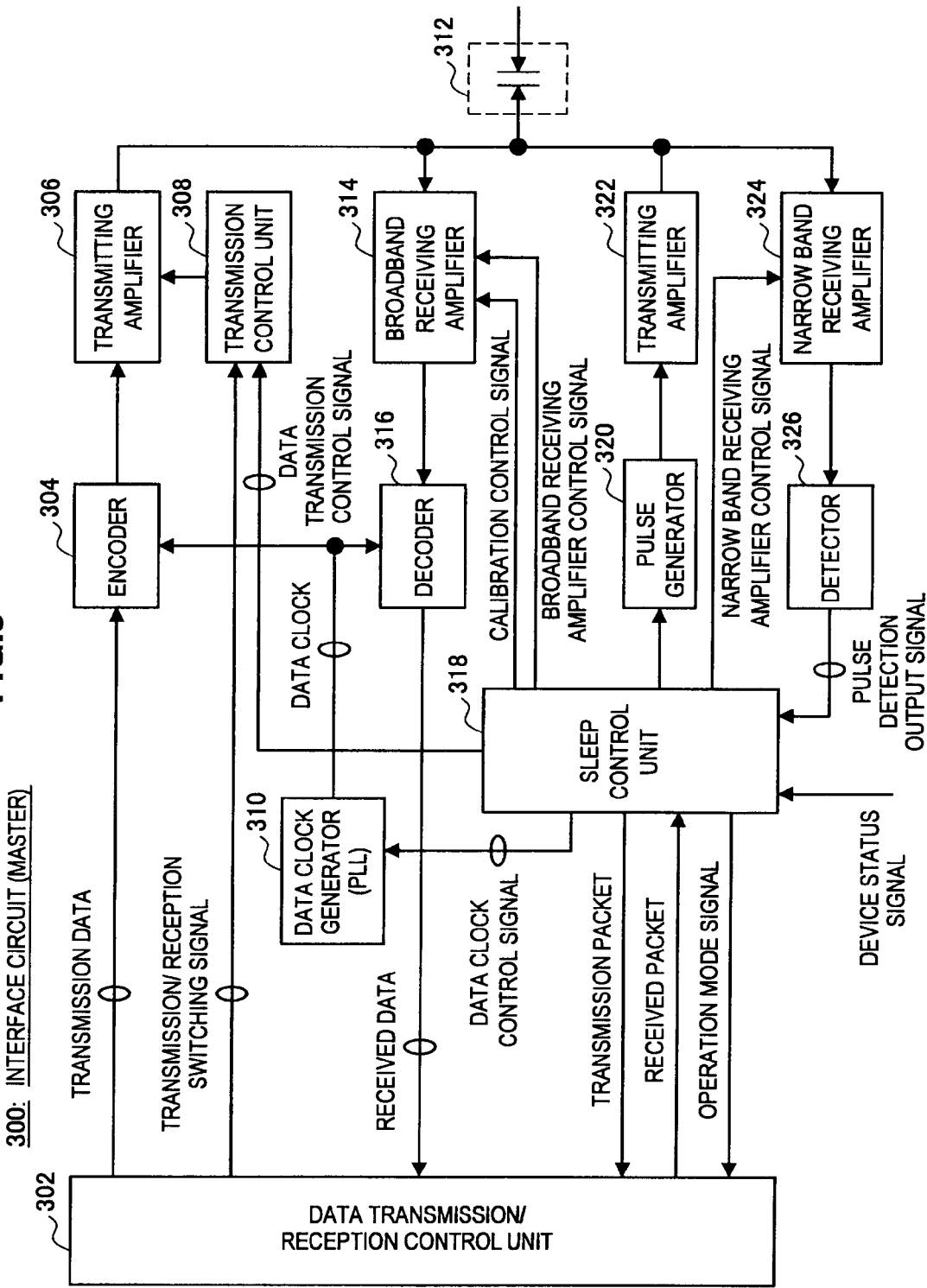
FIG. 9 is an explanatory diagram showing a configuration example of an interface circuit provided with a mode switching control function of a mobile terminal according to an embodiment of the present invention (master)

Next, a circuit configuration of the interface circuit 300 according to the present embodiment will be described with reference to FIGS. 9 and 10. FIG. 9 is an explanatory diagram showing a configuration example of a master device of the interface circuit 300. In contrast, FIG. 10 is an explanatory diagram showing a configuration example of a slave device of the interface circuit 300. Additionally, the master device shown in FIG. 9 and the slave device shown in FIG. 10 are assumed to be connected via a capacitor 312. The capacitor 312 shown in the drawing is shown to clearly indicate DC blocking characteristics of a transmission line assumed in the present embodiment.

(Master Device)

First, a circuit configuration example of a master device capable of controlling the switching of the operation mode will be described with reference to FIG. 9. Additionally, an explanation will be given here for a flow of the master/slave transitioning to the sleep mode and then returning again to the normal mode.

As shown in FIG. 9, the master device includes a data transmission/reception control unit 302, an encoder 304, a transmitting amplifier 306, a transmission control unit 308, a data clock generator 310, a broadband receiving amplifier 314, a decoder 316, and a sleep control unit 318. Furthermore, the master device includes a pulse generator 320, a transmitting amplifier 322, a narrow band receiving amplifier 324, and a detector 326. Also, the master device is connected to the slave device via an interface having the DC blocking characteristics due to the capacitor 312.

First, transmission data is input from the data transmission/reception control unit 302 to the encoder 304. At the encoder 304, an encoding process based on a specific encoding scheme is performed on the transmission data, and the transmission data is converted into encoded data. The encoded data output from the encoder 304 is input to the transmitting amplifier 306. At the transmitting amplifier 306, the encoded data input from the encoder 304 is amplified to a specific signal level. The encoded data amplified by the transmitting amplifier 306 is transmitted to the slave device via the capacitor 312 and the interface. Additionally, the transmission/reception of the encoded data is performed by time-division multiplexing.

Furthermore, encoded data is transmitted to the master device from the slave device via the interface. The encoded data received via the interface is input to the broadband receiving amplifier 314. At the broadband receiving amplifier 314, the encoded data is amplified to a specific signal level. The encoded data amplified by the broadband receiving amplifier 314 is input to the decoder 316. At the decoder 316, a decoding process based on a specific encoding scheme is performed on the encoded data input from the broadband receiving amplifier 314, and the encoded data is converted into received data. The received data output from the decoder 316 is input to the data transmission/reception control unit 302.

As described above, the master device encodes and transmits transmission data to the slave device, and also, decodes encoded data received from the slave device and acquires received data. The interface circuit 300 performs such data transmission in the normal mode. Next, a transition process from the normal mode to the sleep mode will be described. The main structural element controlling the transition from the normal mode to the sleep mode is the sleep control unit 318. Thus, the configuration of the sleep control unit 318 will be mainly described.

The sleep control unit 318 is a circuit for transitioning the operation mode of the master device from the normal mode to the sleep mode or for returning the operation mode to the normal mode from the sleep mode. In case of transition from the normal mode to the sleep mode, the sleep control unit 318 generates a sleep command packet. The sleep command packet generated by the sleep control unit 318 is input to the data transmission/reception control unit 302. At the data transmission/reception control unit 302, the sleep command packet input from the sleep control unit 318 is reconstructed as transmission data. The transmission data output from the data transmission/reception control unit 302 is input to the encoder 304.

When the sleep command packet is input, the encoder 304 encodes the sleep command packet and generates encoded data. The encoded data output from the encoder 304 is input to the transmitting amplifier 306. At the transmitting amplifier 306, the encoded data input from the encoder 304 is amplified to a specific signal level. The encoded data amplified by the transmitting amplifier 306 is transmitted to the slave device via the capacitor 312 and the interface.

When the sleep command packet transmitted to the slave device is properly received, encoded data including an ACK packet is transmitted from the slave device to the master device. The encoded data received via the interface is input to the broadband receiving amplifier 314. At the broadband receiving amplifier 314, the encoded data is amplified to a specific signal level. The encoded data amplified by the broadband receiving amplifier 314 is input to the decoder 316. At the decoder 316, a decoding process based on a specific encoding scheme is performed on the encoded data input from the broadband receiving amplifier 314, and the encoded data is converted into an ACK packet.

The ACK packet output from the decoder 316 is input to the data transmission/reception control unit 302 as received data. Then, the ACK packet input to the data transmission/reception control unit 302 is input to the sleep control unit 318. When the ACK packet is input from the data transmission/reception control unit 302, the sleep control unit 318 inputs a disable signal to the transmission control unit 308 as a data transmission control signal, and puts the operation of the transmitting amplifier 306 in a standby state. Furthermore, the sleep control unit 318 inputs a disable signal to the broadband receiving amplifier 314 as a broadband receiving amplifier control signal, and switches the operation of the broadband receiving amplifier 314 to a standby state.

Furthermore, at the time of transition to the sleep mode, a transmission/reception switching signal for switching between a transmission state and a reception state is input to the transmission control unit 308 in addition to the disable signal. The transmission control unit 308 places, according to the input of the transmission/reception switching signal, the transmitting amplifier 306 in an operation state in case of the transmission state and places the transmitting amplifier 306 in a standby state in case of the reception state. However, when the disable signal is input in the transmission state, the transmission control unit 308 places the transmitting amplifier 306 in a standby state. On the other hand, when the disable signal is input in the reception state, the transmission control unit 308 keeps the transmitting amplifier 306 in the standby state.

As such, when the completion of the preparation for transition to the sleep mode is confirmed through the transmission/reception of the sleep command packet and the ACK packet, the master device switches the operations of the transmitting amplifier 306 and the broadband receiving amplifier 314 to a standby state. Furthermore, in case of switching to the deep sleep mode, a disable signal is input from the sleep control unit 318 to the data clock generator 310 as a data clock control signal, and the operation of the data clock generator 310 is switched to a standby state. The data clock generator 310 is means for generating a clock for transmission data. The data clock generated by the data clock generator 310 is input to the encoder 304 and the decoder 316, and is used for encoding transmission data and decoding received data.

Next, a case of returning to the normal mode from the sleep mode will be described. In case of returning to the normal mode from the sleep mode, the sleep control unit 318 issues an instruction to the pulse generator 320 to transmit a pulse. The pulse generator 320, which received the instruction, generates a clock pulse as shown in FIG. 13 as an activation signal. The clock pulse generated by the pulse generator 320 is input to the transmitting amplifier 322. The transmitting amplifier 322 amplifies the clock pulse input from the pulse generator 320 to a specific amplitude level. Then, the clock pulse amplified by the transmitting amplifier 322 is transmitted to the slave device via the capacitor 312 and the interface.

Furthermore, the sleep control unit 318 inputs an enable signal to the broadband receiving amplifier 314 as a broadband receiving amplifier control signal. When the enable signal is input from the sleep control unit 318, the broadband receiving amplifier 314 switches the operation mode from a standby state to an operation state. Furthermore, the sleep control unit 318 inputs an enable signal to the transmission control unit 308 as a data transmission control signal, and switches the transmitting amplifier 306 to an operable state. Additionally, in case of returning to the normal mode from the deep sleep mode, an enable signal is input from the sleep control unit 318 to the data clock generator 310 as a data clock control signal, and the data clock generator 310 is switched to an operation state. The operation mode of the master device is returned to the normal mode by these switching processes.

When the mode is returned to the normal mode in this manner, the data transmission/reception control unit 302 starts transmission of a frame signal. For example, the data transmission/reception control unit 302 periodically inputs frame data to the encoder 304, and transmits the same to the slave device via the transmitting amplifier 306, the capacitor 312, and the interface. Next, the sleep control unit 318 starts continuous transmission of calibration packets. For example, the sleep control unit 318 periodically inputs the calibration packet to the data transmission/reception control unit 302, and transmits the same to the slave device via the data transmission/reception control unit 302, the encoder 304, the transmitting amplifier 306, the capacitor 312, and the interface.

At the time of returning to the normal mode, calibration is performed also at the slave device. When a calibration packet is transmitted from the master device to the slave device and the calibration packet is properly received at the slave device, the slave device transmits a calibration complete packet to the master device. The calibration complete packet that is transmitted is input to the data transmission/reception control unit 302 via the interface, the capacitor 312, the broadband receiving amplifier 314, and the decoder 316.

The calibration complete packet input to the data transmission/reception control unit 302 is input to the sleep control unit 318. When the calibration complete packet is input from the data transmission/reception control unit 302, the sleep control unit 318 stops the transmission of the calibration packet. The transition to the normal mode is completed at the stage of the transmission of the calibration packet being stopped in this manner. As described, in the present embodiment, the transition from the sleep mode to the normal mode is notified by using a clock pulse. Accordingly, the activation signal can be transmitted from the master device to the slave device also in a system adopting a DC-blocking interface that includes the capacitor 312.

The configuration has been described above according to which the master device issues an instruction for switching to the normal mode. Next, a configuration according to which the slave device issues an instruction for switching to the normal mode will be described. In this case, the clock pulse for notifying the instruction for switching to the normal mode is transmitted from the slave device to the master device.

First, a clock pulse is transmitted from the slave device to the master device. The clock pulse transmitted here is input to the narrow band receiving amplifier 324 via the interface and the capacitor 312. Additionally, in the sleep mode, the broadband receiving amplifier 314 is disabled, but the narrow band receiving amplifier 324 is in an enabled state. A received signal including the clock pulse input to the narrow band receiving amplifier 324 is amplified to a specific amplitude level. Then, the received signal amplified by the narrow band receiving amplifier 324 is input to the detector 326. At the detector 326, the clock pulse is detected from the received signal. Then, the clock pulse detected by the detector 326 is input to the sleep control unit 318.

Figure 15:
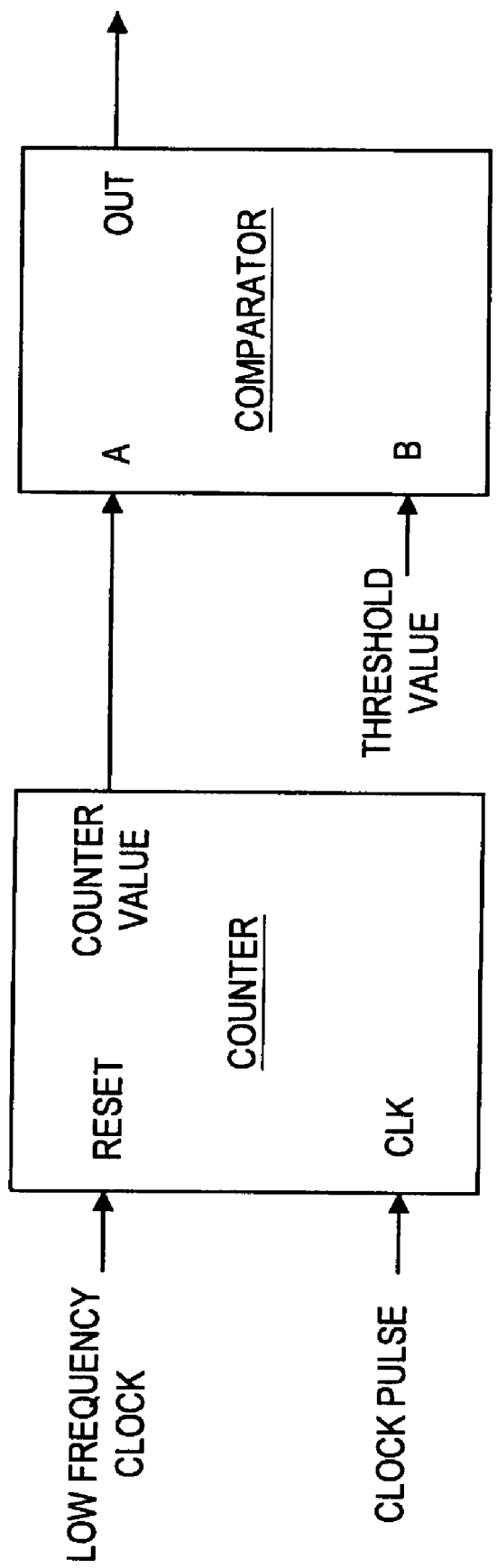
FIG. 15 is an explanatory diagram showing a circuit configuration example of a clock pulse detection circuit according to an embodiment of the present invention.

Additionally, the function of the detector 326 is realized by using a clock pulse detection circuit as shown in FIG. 15, for example. This clock pulse detection circuit is a circuit which causes reset by a low frequency clock with low power consumption and which counts the number of the clock pulses. When using this circuit, a signal whose number of waves is more than a specific number can be detected. Additionally, a configuration is also possible according to which the clock pulse is detected by using a surface acoustic wave (SAW).

Now, when the clock pulse is input, the sleep control unit 318 inputs an enable signal to the broadband receiving amplifier 314 as a broadband receiving amplifier control signal, and switches the broadband receiving amplifier 314 to an operation state. Also, the sleep control unit 318 inputs an enable signal to the transmission control unit 308 as a data transmission control signal, and switches the transmitting amplifier 306 to an operable state. Furthermore, in case of switching from the deep sleep mode to the normal mode, the sleep control unit 318 inputs an enable signal to the data clock generator 310 as a data clock control signal, and switches the data clock generator 310 to an operation state. When the transmitting amplifier 306 and the broadband receiving amplifier 314 are switched to an operation state, the sleep control unit 318 performs a calibration process.

Similarly to the case of transmitting, from the master device, an instruction of switching to the normal mode, the data transmission/reception control unit 302 starts transmission of a frame signal. For example, the data transmission/reception control unit 302 periodically inputs frame data to the encoder 304, and transmits the same to the slave device via the transmitting amplifier 306, the capacitor 312, and the interface. Next, the sleep control unit 318 starts continuous transmission of calibration packets. For example, the sleep control unit 318 periodically inputs the calibration packet to the data transmission/reception control unit 302, and transmits the same to the slave device via the data transmission/ reception control unit 302, the encoder 304, the transmitting amplifier 306, the capacitor 312, and the interface.

At the time of returning to the normal mode, calibration is performed also at the slave device. When a calibration packet is transmitted from the master device to the slave device and the calibration packet is properly received at the slave device, the slave device transmits a calibration complete packet to the master device. The calibration complete packet that is transmitted is input to the data transmission/reception control unit 302 via the interface, the capacitor 312, the broadband receiving amplifier 314, and the decoder 316.

The calibration complete packet input to the data transmission/reception control unit 302 is input to the sleep control unit 318. When the calibration complete packet is input from the data transmission/reception control unit 302, the sleep control unit 318 stops the transmission of the calibration packet. The transition to the normal mode is completed at the stage of the transmission of the calibration packet being stopped in this manner. As described, in the present embodiment, the transition from the sleep mode to the normal mode is notified by using a clock pulse. Accordingly, the activation signal can be also transmitted from the slave device to the master device in a system adopting a DC-blocking interface that includes the capacitor 312.

(Slave Device)

First, a circuit configuration example of the slave device capable of controlling the switching of the operation mode will be described with reference to FIG. 10. Additionally, an explanation will be given here for a flow of the master/slave transitioning to the sleep mode and then returning again to the normal mode.

As shown in FIG. 10, the slave device includes a data transmission/reception control unit 332, an encoder 334, a transmitting amplifier 336, a transmission control unit 338, a data clock generator 340, a broadband receiving amplifier 344, a decoder 346, and a sleep control unit 348. Also, the slave device includes a pulse generator 350, a transmitting amplifier 352, a narrow band receiving amplifier 354, and a detector 356. The slave device is connected to the master device via the interface having the DC blocking characteristics due to the capacitor 312.

First, transmission data is input to the encoder 334 from the data transmission/reception control unit 332. At the encoder 334, an encoding process based on a specific encoding scheme is performed on the transmission data, and the transmission data is converted into encoded data. The encoded data output from the encoder 334 is input to the transmitting amplifier 336. At the transmitting amplifier 336, the encoded data input from the encoder 334 is amplified to a specific signal level. The encoded data amplified by the transmitting amplifier 336 is transmitted to the master device via the capacitor 312 and the interface. Additionally, the transmission/reception of the encoded data is performed by time-division multiplexing.

Furthermore, encoded data is transmitted to the slave device from the master device via the interface. The encoded data received via the interface is input to the broadband receiving amplifier 344. At the broadband receiving amplifier 344, the encoded data is amplified to a specific signal level. The encoded data amplified by the receiving amplifier 344 is input to the decoder 346. At the decoder 346, a decoding process based on a specific encoding scheme is performed on the encoded data input from the broadband receiving amplifier 344, and the encoded data is converted into received data. The received data output from the decoder 346 is input to the data transmission/reception control unit 332.

As described above, the slave device encodes and transmits transmission data to the master device, and also, decodes encoded data received from the master device and acquires received data. The interface circuit 300 performs such data transmission in the normal mode. Next, a transition process from the normal mode to the sleep mode will be described. The main structural element controlling the transition from the normal mode to the sleep mode is the sleep control unit 348. Thus, the configuration of the sleep control unit 348 will be mainly described.

The sleep control unit 348 is a circuit for transitioning the operation mode of the slave device from the normal mode to the sleep mode or for returning the operation mode to the normal mode from the sleep mode. As described above, in case of transition from the normal mode to the sleep mode, a sleep command packet is transmitted from the master device to the slave device. The sleep command packet is input to the broadband receiving amplifier 344 via the interface and the capacitor 312. At the broadband receiving amplifier 344, the sleep command packet is amplified to a specific amplitude level. The sleep command packet amplified by the broadband receiving amplifier 344 is decoded by the decoder 346, and is input to the data transmission/reception control unit 332.

The sleep command packet input to the data transmission/reception control unit 332 is input to the sleep control unit 348. The sleep control unit 348 which has properly received the sleep command packet generates an ACK packet. The ACK packet generated by the sleep control unit 348 is input to the data transmission/reception control unit 332. At the data transmission/reception control unit 332, the ACK packet input from the sleep control unit 348 is reconstructed as transmission data. The transmission data output from the data transmission/reception control unit 332 is input to the encoder 334.

When the ACK packet is input, the encoder 334 encodes the ACK packet, and generates encoded data. The encoded data output from the encoder 334 is input to the transmitting amplifier 336. At the transmitting amplifier 336, the encoded data input from the encoder 334 is amplified to a specific signal level. The encoded data amplified by the transmitting amplifier 336 is transmitted to the master device via the capacitor 312 and the interface. When the ACK packet is transmitted, the sleep control unit 348 inputs a disable signal to the transmission control unit 338 as a data transmission control signal, and puts the operation of the transmitting amplifier 336 to a standby state. Furthermore, the sleep control unit 348 inputs a disable signal to the broadband receiving amplifier 344 as a broadband receiving amplifier control signal, and switches the operation of the broadband receiving amplifier 344 to a standby state.

Furthermore, at the time of transition to the sleep mode, a transmission/reception switching signal for switching between a transmission state and a reception state is input to the transmission control unit 338 in addition to the disable signal. The transmission control unit 338 places, according to the input of the transmission/reception switching signal, the transmitting amplifier 336 in an operation state in case of the transmission state and places the transmitting amplifier 336 in a standby state in case of the reception state. However, when the disable signal is input in the transmission state, the transmission control unit 338 places the transmitting amplifier 336 in a standby state. On the other hand, when the disable signal is input in the reception state, the transmission control unit 338 keeps the transmitting amplifier 336 in the standby state.

As such, when the ACK packet is transmitted and the preparation for transition to the sleep mode is complete, the slave device switches the operations of the transmitting amplifier 336 and the broadband receiving amplifier 344 to a standby state. Additionally, the deep sleep mode is not set in the slave device. This is because the configuration of the data clock generator 340 provided in the slave device is different from the configuration of the data clock generator 310 provided in the master device. The clock regeneration method according to the new scheme is as described above, and the data clock generator 340 regenerates clock based on the polarity inversion cycle of a received signal, as with the new scheme. Thus, a PLL is not provided in the data clock generator 340, and the effect of reduction in the power consumption obtained by placing the data clock generator 340 in a standby state is small. Accordingly, there is not much advantage in providing the deep sleep mode in the slave device.

Next, a case of returning to the normal mode from the sleep mode will be described. In case of returning to the normal mode from the sleep mode, the sleep control unit 348 issues an instruction to the pulse generator 350 to transmit a pulse. The pulse generator 350, which received the instruction, generates a clock pulse as shown in FIG. 13 as an activation signal. The clock pulse generated by the pulse generator 350 is input to the transmitting amplifier 352. The transmitting amplifier 352 amplifies the clock pulse input from the pulse generator 350 to a specific amplitude level. Then, the clock pulse amplified by the transmitting amplifier 352 is transmitted to the master device via the capacitor 312 and the interface.

Furthermore, the sleep control unit 348 inputs an enable signal to the broadband receiving amplifier 344 as a broadband receiving amplifier control signal. When the enable signal is input from the sleep control unit 348, the broadband receiving amplifier 344 switches the operation mode from a standby state to an operation state. Furthermore, the sleep control unit 348 inputs an enable signal to the transmission control unit 338 as a data transmission control signal, and switches the transmitting amplifier 336 to an operable state. Additionally, in case of returning to the normal mode from the deep sleep mode, an enable signal is input from the sleep control unit 348 to the data clock generator 340 as a data clock control signal, and the data clock generator 340 is switched to an operation state. The operation mode of the slave device is returned to the normal mode by these switching processes.

When the mode is returned to the normal mode in this manner, transmission of a calibration packet is started by the master device. Also, at the time of returning to the normal mode, calibration is also performed at the slave device. First, the sleep control unit 348 instructs the start of calibration to the broadband receiving amplifier 344. When the instruction is received from the sleep control unit 348, the broadband receiving amplifier 344 performs calibration such as AGC (Automatic Gain Control) gain adjustment or the like. When calibration is complete, the broadband receiving amplifier 344 is enabled to receive the calibration packet. When the calibration packet is received by the broadband receiving amplifier 344, the calibration packet is input to the sleep control unit 348 via the data transmission/reception control unit 332.

When the calibration packet is input from the data transmission/reception control unit 332, the sleep control unit 348 stops calibration of the broadband receiving amplifier 344. Then, the sleep control unit 348 generates a calibration complete packet, and inputs the same to the data transmission/reception control unit 332. The calibration complete packet input to the data transmission/reception control unit 332 is transmitted to the master device via the encoder 334, the transmitting amplifier 336, the capacitor 312, and the interface. The transition to the normal mode is completed at the stage the transmission of the calibration complete packet is completed. The slave device will transmit the calibration complete packet for the received calibration packet until the master device stops transmission of the calibration packet.

As described, in the present embodiment, the transition from the sleep mode to the normal mode is notified by using a clock pulse. Accordingly, the activation signal can be also transmitted from the slave device to the master device in a system adopting a DC-blocking interface that includes the capacitor 312.

The configuration has been described above according to which the slave device issues an instruction for switching to the normal mode. Next, a configuration according to which the master device issues an instruction for switching to the normal mode will be described. In this case, the clock pulse for notifying the instruction for switching to the normal mode is transmitted from the master device to the slave device.

First, a clock pulse is transmitted from the master device to the slave device. The clock pulse transmitted here is input to the narrow band receiving amplifier 354 via the interface and the capacitor 312. Additionally, in the sleep mode, the broadband receiving amplifier 344 is disabled, but the narrow band receiving amplifier 354 is in an enabled state. A received signal including the clock pulse input to the narrow band receiving amplifier 354 is amplified to a specific amplitude level. Then, the received signal amplified by the narrow band receiving amplifier 354 is input to the detector 356. At the detector 356, the clock pulse is detected from the received signal. Then, the clock pulse detected by the detector 356 is input to the sleep control unit 348.

When the clock pulse is input, the sleep control unit 348 inputs an enable signal to the broadband receiving amplifier 344 as a broadband receiving amplifier control signal, and switches the broadband receiving amplifier 344 to an operation state. Also, the sleep control unit 348 inputs an enable signal to the transmission control unit 338 as a data transmission control signal, and switches the transmitting amplifier 336 to an operable state. When the transmitting amplifier 336 and the broadband receiving amplifier 344 are switched to an operation state, the sleep control unit 348 performs a calibration process.

Similarly to the case of transmitting, from the slave device, an instruction for switching to the normal mode, when the mode is returned to the normal mode, transmission of calibration packets is started by the master device. Furthermore, when returning to the normal mode, calibration is also performed at the slave device. First, the sleep control unit 348 instructs the broadband receiving amplifier 344 to start calibration. When the instruction is received from the sleep control unit 348, the broadband receiving amplifier 344 performs calibration such as AGC (Automatic Gain Control) gain adjustment or the like. When the calibration is complete, the broadband receiving amplifier 344 is enabled to receive the calibration packet. When the calibration packet is received by the broadband receiving amplifier 344, the calibration packet is input to the sleep control unit 348 via the data transmission/reception control unit 332.

When the calibration packet is input from the data transmission/reception control unit 332, the sleep control unit 348 stops calibration of the broadband receiving amplifier 344. Then, the sleep control unit 348 generates a calibration complete packet, and inputs the same to the data transmission/reception control unit 332. The calibration complete packet input to the data transmission/reception control unit 332 is transmitted to the master device via the encoder 334, the transmitting amplifier 336, the capacitor 312, and the interface. The transition to the normal mode is completed at the stage the transmission of the calibration complete packet is completed. The slave device will transmit the calibration complete packet for the received calibration packet until the master device stops transmission of the calibration packet.

As described, in the present embodiment, the transition from the sleep mode to the normal mode is notified by using a clock pulse. Accordingly, the activation signal can be also transmitted from the slave device to the master device in a system adopting a DC-blocking interface that includes the capacitor 312.

Heretofore, the circuit configuration example of the interface circuit 300 according to the present embodiment has been described. Also, the operation mode switching method according to the present embodiment has been described. As described above, in the operation mode switching method according to the present embodiment, the start of transition from the sleep mode to the normal mode is notified by a clock pulse. Thus, it becomes possible to notify the start of transition of the operation mode through a DC-blocking transmission line, and an electronic device adopting the encoding scheme of the new scheme described above is also enabled to perform the operation mode switching control. As a result, the power consumption of the electronic device according to the new scheme can be further reduced.

(2-2: Outline of Mode Switching Method)

Next, referring to FIGS. 11 and 12, an explanation will be given on a trigger at the time of occurrence of transition between operation modes, the trigger being used in the present embodiment. FIG. 11 is a state transition diagram showing transition between the operation modes. FIG. 12 is an explanatory diagram summarizing trigger conditions at the time of occurrence of transition between the operation modes. Here, a case is assumed where the master device supports three types of modes, i.e. normal mode, sleep mode and deep sleep mode, and the slave device supports two types of modes, i.e. normal mode and sleep mode.

Note that, in (system) normal mode, both the master device and the slave device are in the normal mode. In (system) sleep mode, both the master device and the slave device are in the sleep mode. In (system) deep sleep mode, the master device is in the deep sleep mode, and the slave device is in the sleep mode. Additionally, the expression (system) is for expressing an operation mode of the whole system including the master device and the slave device. FIG. 11 shows these conditions in greater detail.

As shown in FIG. 11, in the (system) normal mode, the PLL and the broadband receiving means of the master device are enabled, and the broadband receiving means of the slave device is enabled. In the (system) sleep mode, the PLL of the master device is enabled, the broadband receiving means of the master device is disabled, and the broadband receiving means of the slave device is disabled. In the (system) deep sleep mode, the PLL and the broadband receiving means of the master device are disabled, and the broadband receiving means of the slave device is disabled.

Furthermore, the (system) normal mode transitions to the (system) sleep mode by triggers 1 and 5. The (system) normal mode transitions to the (system) deep sleep mode by trigger 3. The (system) sleep mode transitions to the (system) deep sleep mode by trigger 3. The (system) sleep mode transitions to the (system) normal mode by triggers 2, 6 and 7. The (system) deep sleep mode transitions to the (system) normal mode by triggers 4 and 7. The (system) deep sleep mode transitions to the (system) sleep mode by trigger 1.

As shown in FIG. 12, among cases for transition from the (system) normal mode to the (system) sleep mode, trigger 1 mentioned above occurs in case the master device receives an instruction from a processor or the like (Platform). Among cases for transition from the (system) sleep mode to the (system) normal mode, trigger 2 mentioned above occurs in case the master device receives an instruction from a processor or the like (Platform). Among cases for transition from the (system) normal mode to the (system) deep sleep mode, trigger 3 mentioned above occurs in case the master device receives an instruction from a processor or the like (Platform).

Among cases for transition from the (system) deep sleep mode to the (system) normal mode, trigger 4 mentioned above occurs in case the master device receives an instruction from a processor or the like (Platform). Among cases for transition from the (system) normal mode to the (system) sleep mode, trigger 5 mentioned above occurs in case the master device monitors the state of each device and automatically starts transition to the sleep mode. Among cases for transition from the (system) sleep mode to the (system) normal mode, trigger 6 mentioned above occurs in case the master device monitors the state of each device and automatically starts transition to the sleep mode. Among cases for transition from the (system) sleep mode to the (system) normal mode, trigger 7 mentioned above occurs in case the slave device monitors the state of each device and automatically starts transition to the sleep mode.

With regard to the mode switching method according to the present embodiment, the conditions of the triggers and the transition rules at the time of start of transition between the operation modes are approximately as described above. In the following, this mode switching method will be described in greater detail.

(2-3: Details of Mode Switching Method)

Here, the rules for transition between the operation modes, in relation to the mode switching method according to the present embodiment, will be described in detail. First, referring to FIGS. 16A to 16C, the operation of the master device in relation to the transition between the operation modes will be described. Next, referring to FIGS. 17A and 17B, the operation of the slave device in relation to the transition between the operation modes will be described. First, an explanation will be given on each operation mode and each state during the transition.

(Explanation on Mode and State with Regard to State Transition of Master Device)

First, an explanation will be given on the mode and the state with regard to the state transition of the master device.

(Normal Mode)

The normal mode is an operation state in which broadband data transmission is immediately possible. For example, transition to the normal mode takes place when an instruction for the normal mode is issued from the outside in a state where an automatic sleep function is off. Also, transition to the normal mode takes place when the master device is determined to be active with regard to a transmission state in a state where the automatic sleep function is on.

(Sleep Mode)

The sleep mode is a state where the broadband receiving means is disabled but the clock generator necessary for broadband data transmission is enabled. The sleep mode consumes more power than the deep sleep mode. However, the clock generator does not have to be activated at the time of transition to the normal mode, and thus time taken until the start of broadband data transmission is short to that extent. In case of transition from the sleep mode to the normal mode, the master device has to enable the broadband receiving means, and also has to transmit a clock pulse to the slave device and enable the broadband receiving means of the slave device.

(Deep Sleep Mode)

The deep sleep mode is a state where both the broadband receiving means and the clock generator are disabled. In the deep sleep mode, the return to the normal mode will take time because it takes time to activate the clock generator (PLL), but it is possible to further reduce the power consumption. In case of transition from the sleep mode to the normal mode, the master device has to enable the broadband receiving means, and also has to transmit a clock pulse to the slave device and enable the broadband receiving means of the slave device.

(Idling State)

In a state where the automatic sleep function is on, the master device detects a state where there is no transmission request and automatically transitions to the sleep mode. Note that, to prevent the transition between the normal mode and the sleep mode from occurring frequently, it is desirable that the master device waits for a certain period of time before transitioning to the sleep mode even if the state is detected where there is no transmission request. Accordingly, a waiting state of a specific period of time is provided after the detection of a state where there is no transmission request. This waiting state is called an idling state.

(Ack Waiting State)

An ACK waiting state is a state of waiting until the master device receives an ACK packet transmitted from the slave device after the master device transmitted a sleep command packet to the slave device.

(Calibration Complete Packet Waiting State)

Figure 16A:
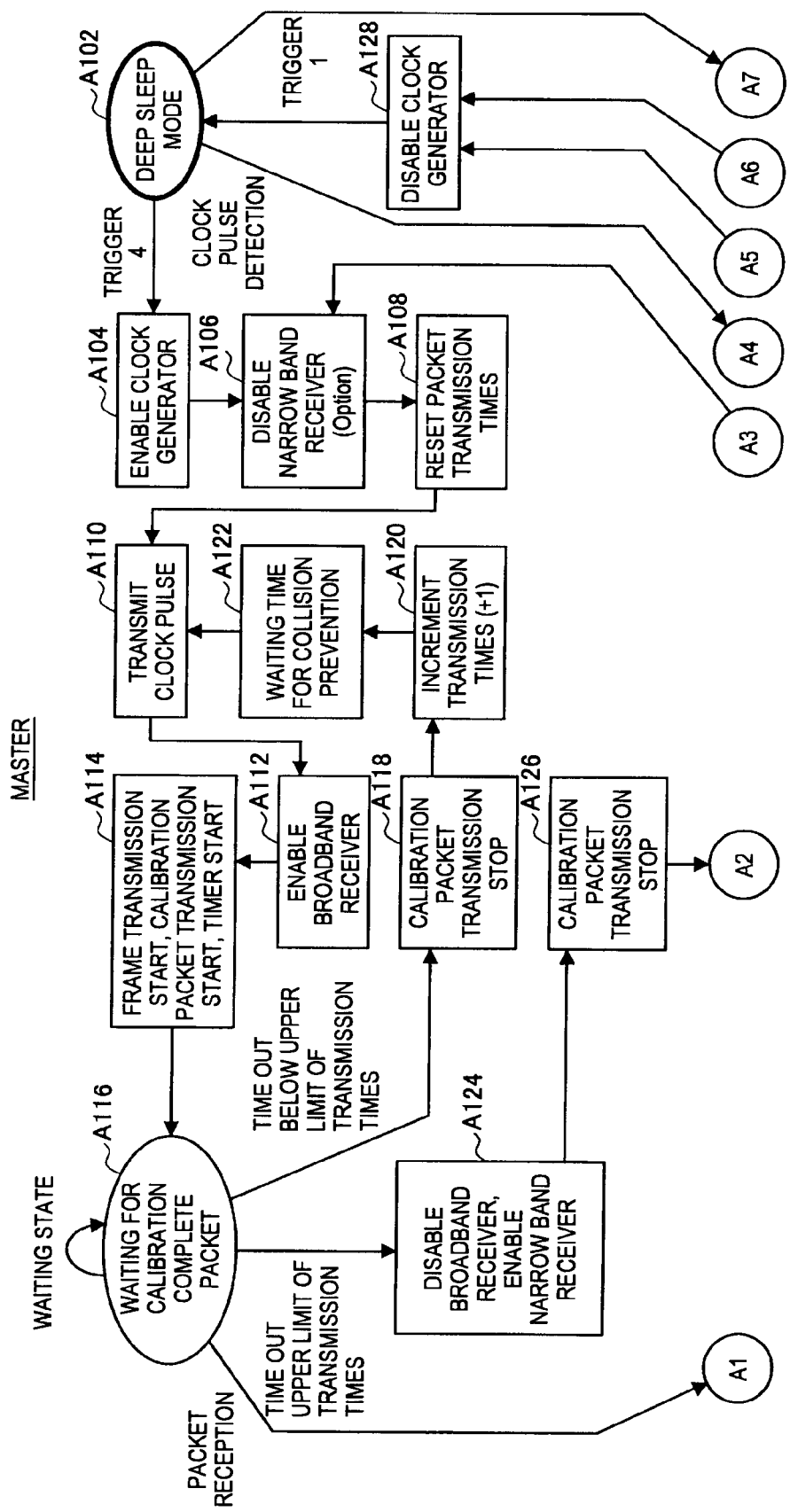
FIG. 16A is an explanatory diagram showing in detail process steps to be performed at the master side at the time of switching to each mode, with regard to a mode switching method according to an embodiment of the present invention.
Figure 16B:
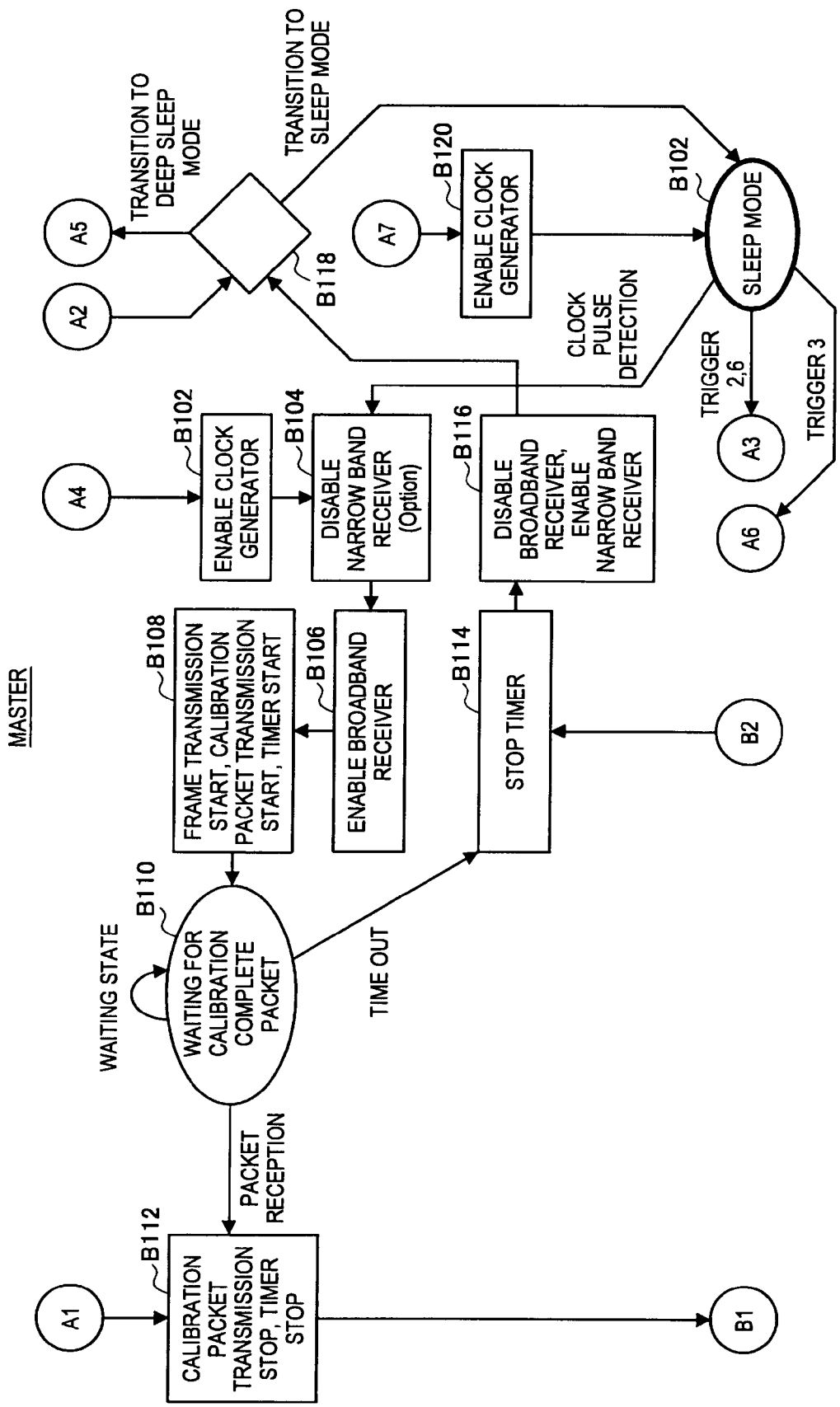
FIG. 16B is an explanatory diagram showing in detail process steps to be performed at the master side at the time of switching to each mode, with regard to a mode switching method according to an embodiment of the present invention.

A calibration complete packet waiting state (A116) shown in FIG. 16A is a state of waiting until the master device receives a calibration complete packet transmitted from the slave device after the master device transmitted a clock pulse to the slave device and instructed the slave device to transition to the normal mode. A calibration complete packet waiting state (B110) shown in FIG. 16B is a state of waiting until the master device receives a calibration complete packet transmitted from the slave device after the master device received a clock pulse from the slave device and performed a procedure of transitioning to the normal mode.

Heretofore, each operation mode and main states during transition have been described. In the following, an explanation will be given on the operation of the master device performed during the transition between the normal mode, the sleep mode and the deep sleep mode. Here, the transition to the sleep mode and the deep sleep mode are to be performed by the master device, but not by the slave device.

(State Transition of Master Device)

As shown in FIG. 16C, after the power is turned on (C102) and initialization is performed (C104), transition to normal mode C106 takes place. For example, in case of the master device receiving an instruction from the outside and transitioning from the normal mode to the sleep mode (triggers 1, 3), the master device resets the number of packet transmission times (C112). Then, the master device transmits a sleep command packet to the slave device (C114). Then, the master device starts a timer (C116), and waits for reception of an ACK packet that is transmitted from the slave device (C118).

When an ACK packet is received, the master device proceeds to step B114 of FIG. 16B, stops the timer (B114), and disables a broadband receiver while also enabling a narrow band receiver (B116). Then, the master device transitions to sleep mode B102 via step B118. Also, in case an ACK packet is not received in step C118 of FIG. 16C and the timer has timed out, the master device checks the number of packet transmission times. In case the number of packet transmission times has not reached the upper limit, the master device proceeds to the process of step C120, increments the number of packet transmission times by 1 (C120), and repeats the processes of steps C114, C116 and C118. On the other hand, in case the number of packet transmission times has already reached the upper limit, the master device proceeds to the process of step S122, stops the timer (C122), and returns to normal mode C106.

As shown in FIG. 16C, after the power is turned on (C102) and initialization is performed (C104), transition to normal mode C106 takes place. For example, in case of the master device receiving an instruction from the outside and transitioning from the normal mode to the sleep mode (triggers 1, 3), the master device resets the number of packet transmission times (C112). Then, the master device transmits a sleep command packet to the slave device (C114). Then, the master device starts a timer (C116), and waits for reception of an ACK packet that is transmitted from the slave device (C118).

When an ACK packet is received, the master device proceeds to step B114 of FIG. 16B, stops the timer (B114), and disables the broadband receiver while also enabling the narrow band receiver (B116). Then, the master device proceeds to step A128 of FIG. 16A via step B118, and disables a clock generator (A128). Then, the master device proceeds to step A102, and transitions to the deep sleep mode.

Furthermore, in case an ACK packet is not received in step C118 of FIG. 16C and the timer has timed out, the master device checks the number of packet transmission times. In case the number of packet transmission times has not reached the upper limit, the master device proceeds to the process of step C120, increments the number of packet transmission times by 1 (C120), and repeats the processes of steps C114, C116 and C118. On the other hand, in case the number of packet transmission times has already reached the upper limit, the master device proceeds to the process of step S122, stops the timer (C122), and returns to normal mode C106.

When there is no data to be transmitted in the state of normal mode C106, the master device proceeds to the process of step C108, starts the timer (C108), and transitions to the idling state (C110). When data to be transmitted occurs (active state), the master device transitions again to normal mode C106. On the other hand, in case the timer has timed out, the master device proceeds to the process of step C112, and resets the number of packet transmission times (C112). The processes after step C112 are the same as the above-described processes relating to the transition to the sleep mode or to the deep sleep mode.

In case an instruction for transition to the normal mode is received from the outside or it is detected that data to be transmitted has occurred in sleep mode B102 of FIG. 16B (triggers 2, 6), the master device proceeds to the process of step A106 of FIG. 16A, and disables the narrow band receiver (A106). Furthermore, the master device resets the number of packet transmission times (A108), and transmits a clock pulse to the slave device (A110).

Then, the master device enables the broadband receiver (A112), and starts transmission of a frame signal (A114). Furthermore, the master device starts continuous transmission of calibration packets while also starting the timer (A114). Then, the master device transitions to calibration complete packet waiting state A116.

When a calibration complete packet is received in calibration complete packet waiting state A116, the master device proceeds to step B112 of FIG. 16B, stops the transmission of the calibration packets while also stopping the timer (B112). Then, the master device proceeds to step C106 of FIG. 16C, and transitions to the normal mode.

Furthermore, in case the timer has timed out and the number of packet transmission times has not reached the upper limit in calibration complete packet waiting state A116 of FIG. 16A, the master device proceeds to the process of step A118, and stops the transmission of the calibration packets (A118). Then, the master device adds 1 to the number of packet transmission times (A120), and enters a waiting time for collision prevention (A122). Then, after performing the processes of steps A110 to A114, the master device transitions again to calibration complete packet waiting state A 116.

Furthermore, in case the timer has timed out and the number of packet transmission times has already reached the upper limit in calibration complete packet waiting state A 116 of FIG. 16A, the master device proceeds to the process of step A124, disables the broadband receiver, and enables the narrow band receiver (A124). Then, the master device stops the transmission of the calibration packets (A126), and proceeds to step B118 of FIG. 16B. Then, the master device transitions to the sleep mode or to the deep sleep mode.

When an instruction for transition to the normal mode is received from the outside or occurrence of data to be transmitted is detected in deep sleep mode A102 of FIG. 16A, the master device proceeds to the process of step A104, and enables the clock generator (A104). Then, the master device disables the narrow band receiver (A106), and resets the number of packet transmission times (A108). Next, the master device transmits a clock pulse (A110), and enables the broadband receiver (A112). Next, the master device starts the transmission of a frame signal, starts the continuous transmission of the calibration packets, and also, starts the timer (A114). Then, the master device transitions to calibration complete packet waiting state A116.

When a clock pulse transmitted by the slave device is detected in sleep mode B102 of FIG. 16B, the master device proceeds to the process of step B104, and disables the narrow band receiver (B104). Next, the master device enables the broadband receiver (B106), starts the transmission of a frame signal, starts the continuous transmission of the calibration packets, and also, starts the timer (B108). Then, the master device transitions to the calibration complete packet waiting state B110.

When a calibration complete packet is received in the calibration complete packet waiting state B110, the master device stops the transmission of the calibration packets while also stopping the timer (B112). Then, the master device transitions to the normal mode C106 of FIG. 16C. On the other hand, when a calibration complete packet is not received and the time out is reached in the calibration complete packet waiting state B110 of FIG. 16B, the master device proceeds to the process of step B114. Next, the master device proceeds to the processes of steps B116 and B118, and transitions to the sleep mode or to the deep sleep mode.

Furthermore, when a clock pulse transmitted by the slave device is detected in deep sleep mode A102 of FIG. 16A, the master device proceeds to the process of step A104, and enables the clock generator (A104). Next, the master device proceeds to the process of step A106, and performs the same processes as in the case where a clock pulse is detected in sleep mode B102 of FIG. 16B.

When an instruction for transition to the deep sleep mode is received in sleep mode B102 of FIG. 16B (trigger 3), the master device proceeds to step A128 of FIG. 16A, and disables the clock generator (A128). Then, the master device transitions to deep sleep mode A102. Also, in case an instruction for transition to the sleep mode is received in deep sleep mode A102, the master device proceeds to the process of step B120 of FIG. 16B, and enables the clock generator (B120). Then, the master device transitions to sleep mode B102.

Heretofore, an explanation has been given for various cases on the processes for transition between possible states of the master device. Next, an explanation will be given on the transition between possible states of the slave device.

(Explanation on Mode and State with Regard to State Transition of Slave Device)

First, an explanation will be given on the mode and the state with regard to the state transition of the slave device.

(Normal Mode)

The normal mode is an operation state in which broadband data transmission is immediately possible. Note that the slave device will not request the master device to transition to the sleep mode.

(Sleep Mode)

The sleep mode is a state where the power consumption is reduced by disabling the broadband receiver and enabling the narrow band receiver. Additionally, the transition to the normal mode is started when the slave device receives a clock pulse transmitted by the master device or when the occurrence of data to be transmitted via broadband by the slave device is detected.

(Calibration Packet Reception Waiting State)

Figure 17A:
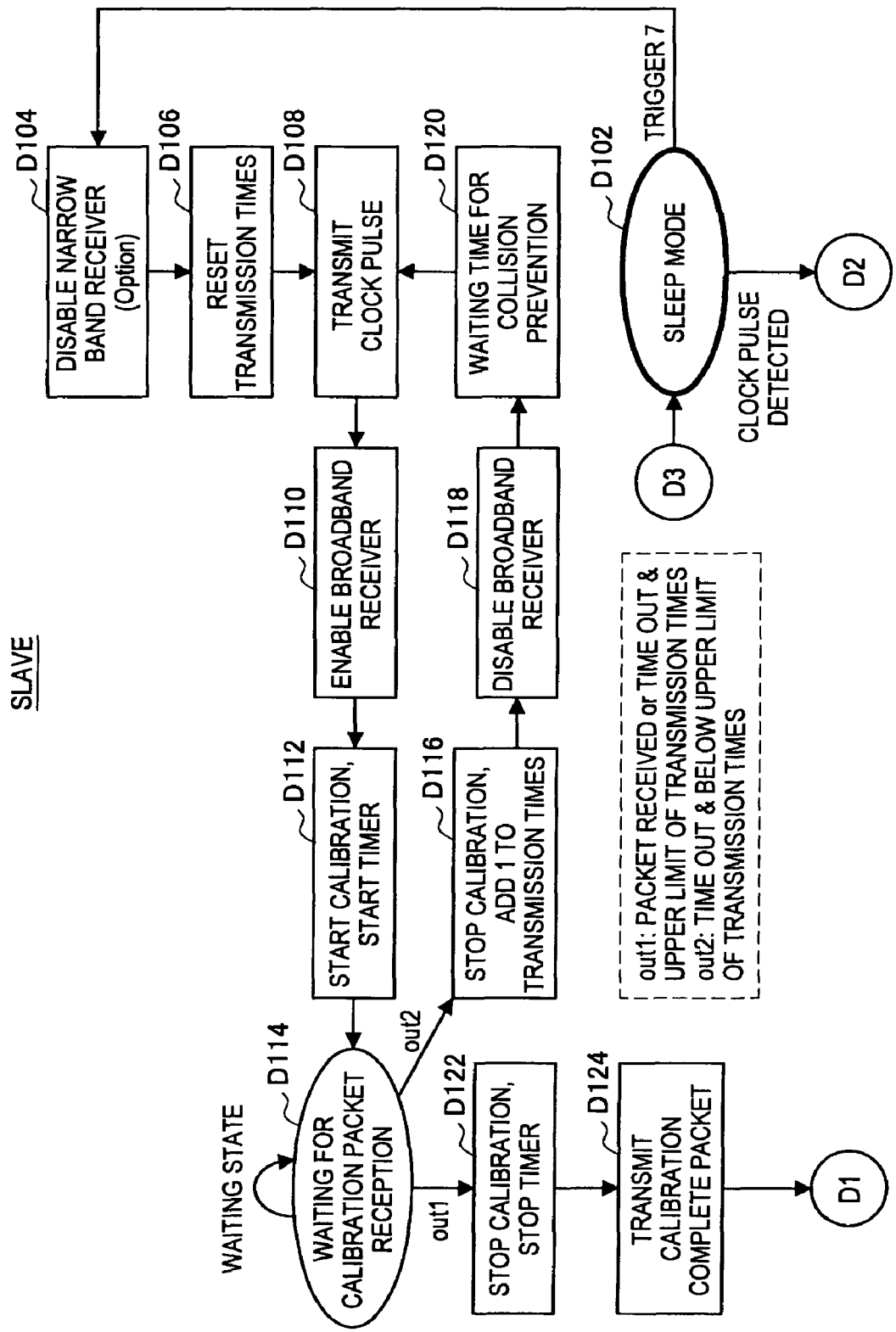
FIG. 17A is an explanatory diagram showing in detail process steps to be performed at the slave side at the time of switching to each mode, with regard to a mode switching method according to an embodiment of the present invention.

When a transmission request to the slave device occurs, the slave device transmits a clock pulse to the master device, and enables a broadband receiver. A calibration packet reception waiting state (D114) shown in FIG. 17A is a state of waiting until a calibration packet transmitted by the master device is received after the broadband receiver of the master device is enabled. Furthermore, after receiving a clock pulse transmitted by the master device, the slave enables the broadband receiver. A calibration packet reception waiting state (E120) of FIG. 17B is a state of waiting until a calibration packet transmitted by the master device is received after the broadband receiver of the master device is enabled.

(State Transition of Slave Device)

Next, an explanation will be given on the operation of the slave device during the transition between the normal mode, the sleep mode and the deep sleep mode. In this example, although the deep sleep mode is not set for the slave device for the sake of explanation, it is also possible to set the deep sleep mode.

As shown in FIG. 17B, after the power is turned on (E102) and initialization is performed (E104), transition to normal mode E106 takes place. When a sleep command is received in normal mode E106, the slave device proceeds to the process of step E108, and transmits an ACK packet (E108). Next, the slave device disables the broadband receiver (E110), and enables the narrow band receiver (E112). Then, the slave device transitions to sleep mode D102 of FIG. 17A.

When data to be transmitted via broadband occurs in sleep mode D102 of FIG. 17A (trigger 7), the slave device proceeds to step D104, and disables the narrow band receiver (D104). Next, the slave device resets the number of packet transmission times (D106), and transmits a clock pulse to the master device (D108). Next, the slave device enables the broadband receiver (D110), and starts calibration while also starting a timer (D112). Then, the slave device transitions to calibration packet reception waiting state D114.

When a calibration packet is received or when a calibration packet is not received, time out is reached and the number of clock pulse transmission times has reached the upper limit (out1) in calibration packet reception waiting state D114 of FIG. 17A, the slave device proceeds to the process of step D122. Then, the slave device stops the calibration, and stops the timer (D122). Next, the slave device transmits a calibration complete packet to the master device (D124), and transitions to normal mode E106 of FIG. 17B.

When a calibration packet is not received, time out is reached and the number of clock pulse transmission times has not reached the upper limit (out2) in calibration packet reception waiting state D114 of FIG. 17A, the slave device proceeds to the process of step D116. Then, the slave device stops the calibration, and adds 1 to the number of transmission times (D116). Next, the slave device disables the broadband receiver (D118), and enters a waiting time for collision prevention (D120). Then, the slave device transitions to calibration packet reception waiting state D114 via the processes of steps D108, D110 and D112.

When a clock pulse is detected in sleep mode D102 of FIG. 17A, the slave device proceeds to step E114 of FIG. 17B, and disables the narrow band receiver (E114). Next, the slave device enables the broadband receiver (E116), and starts calibration while also starting a timer (E118). Then, the slave device transitions to calibration packet reception waiting state E120. When a calibration packet is received in calibration packet reception waiting state E120, the slave device proceeds to the process of step E122.

Then, the slave device stops calibration, and stops the timer (D122). Next, the slave device transmits a calibration complete packet to the master device (E124), and transitions to normal mode E106. Also, when a calibration packet is not received and time out is reached in calibration packet reception waiting state E120 of FIG. 17B, the slave device stops calibration (E126), and transitions to sleep mode D102 of FIG. 17A via the processes of steps E110 and E112.

When a calibration packet is received in normal mode E106 of FIG. 17B, the slave device proceeds to the process of step E124 and transmits a calibration complete packet (E124), and then returns again to normal mode E106.

Heretofore, the mode switching method according to the present embodiment has been described in detail. By applying the method of the present embodiment, transition from the sleep mode to the normal mode is enabled in an interface system using a transmission line through which a DC component may not pass. Furthermore, by performing calibration by using a packet transmitted in the checking procedure for the transition from the sleep mode to the normal mode, a time efficient activation process (transition from the sleep mode to the normal mode) is enabled.

3. CONCLUSION

Hereunder, the technical contents of the present embodiment will be briefly described. The technology according to the present embodiment relates to a method of switching between operation modes while exchanging packets through a DC-blocking transmission line, in relation to an interface system including a master device and a slave device. Particularly, one of the characteristics lies in that a clock pulse is used as an activation signal at the time of notifying a counterpart device of transition from a sleep mode (or a deep sleep mode) to a normal mode. Here, subsequent processes including the transmission/reception of the activation signal and a calibration process will be briefly described.

(Case of Master Device Transmitting Activation Signal)

First, a case of the master device transmitting the activation signal will be described. In case of activation from the deep sleep mode, the master device first enables a clock generation circuit such as a PLL. Next, the master device starts transmission of the activation signal, disables a narrow band receiver and enables a broadband receiver. Then, the master device starts transmission of a frame signal, and at the same time, starts continuous transmission of calibration packets.

However, in case the deep sleep mode is not supported, the clock generation circuit such as a PLL does not have to be enabled.

In case of activation from the deep sleep mode, the slave device which has received the activation signal first enables the clock generation circuit such as a PLL. Next, the slave device disables a narrow band receiver and enables a broadband receiver. Then, when a frame signal is received, the slave device enables a function of performing calibration on the received signal. However, in case the deep sleep mode is not supported, the clock generation circuit such as a PLL does not have to be enabled.

Furthermore, the slave device performs calibration during the transmission period of calibration packets. When the calibration process is complete, the slave device is enabled to properly receive a calibration packet. The slave device that received a calibration packet disables the calibration function as appropriate, and transitions to the normal mode. However, in case of a system where the calibration is allowed all the time, the process of disabling the calibration function is not necessary. Additionally, the slave device transmits, to the master device, one calibration complete packet for one calibration packet.

For its part, the master device performs calibration during the transmission period of calibration complete packets. When the calibration process is complete, the master device is enabled to properly receive a calibration complete packet. The master device that properly received a calibration complete packet stops the continuous transmission of calibration packets, and transitions to the normal mode. In case of the master device transmitting the activation signal, the configuration described above enables the return to the normal mode from the sleep mode (or the deep sleep mode).

(Case of Slave Device Transmitting Activation Signal)

Next, a case of the slave device transmitting the activation signal will be described. In case of activation from the deep sleep mode, the slave device first enables a clock generation circuit such as a PLL. Next, the slave device starts transmission of the activation signal, disables a narrow band receiver and enables a broadband receiver. However, in case the deep sleep mode is not supported, the clock generation circuit such as a PLL does not have to be enabled.

In case of activation from the deep sleep mode, the master device first enables the clock generation circuit such as a PLL upon receipt of the activation signal. Next, the master device disables the narrow band receiver, and enables the broadband receiver. Then, the master device starts transmission of the frame signal, and at the same time, starts continuous transmission of the calibration packets. However, in case the deep sleep mode is not supported, the clock generation circuit such as a PLL does not have to be enabled.

When the frame signal is received, the slave device enables a function of performing calibration on the received signal. Also, the slave device performs calibration during the transmission period of the calibration packets. When the calibration process is complete, the slave device is enabled to properly receive a calibration packet. The slave device that received a calibration packet disables the calibration function as appropriate, and transitions to the normal mode. However, in case of a system where the calibration is allowed all the time, the calibration function does not have to be disabled. Additionally, the slave device transmits, to the master device, one calibration complete packet for one calibration packet.

For its part, the master device performs calibration during the transmission period of the calibration complete packets. When the calibration process is complete, the master device is enabled to properly receive a calibration complete packet.

The master device that properly received a calibration complete packet stops the continuous transmission of the calibration packets, and transitions to the normal mode. In case of the slave device transmitting the activation signal, the configuration described above enables the return to the normal mode from the sleep mode (or the deep sleep mode).

(Supplementary Explanation)

Normally, a broadband amplifier has to be operated to realize high speed transmission of 500 Mbps or the like, and its power consumption will be hard to ignore. Thus, as described above, in the present embodiment, the broadband amplifier is placed in standby in the sleep mode. As a result, power can be efficiently saved. Also, at the time of transition from the sleep mode to the normal mode, a notification on the switching of mode is issued in many cases from the master device to the slave device by changing the DC voltage of the transmission line. However, the system to which the technology of the present embodiment is applied assumes to supply a DC power in addition to a transmission signal, and it is hard to apply a method of notifying the switching of mode by changing the DC voltage in the transmission line.

Thus, in the present embodiment, the timing of transition from the sleep mode to the normal mode is notified by supplying a clock pulse capable of passing a transmission line designed not to let a DC component pass at the time of activation. Furthermore, in the present embodiment, a narrow band amplifier remains in operation in the sleep mode so that a clock pulse can be received, and the power consumption is reduced compared to a case where a broadband amplifier is kept in operation.

Furthermore, in many transmission systems, before starting data transmission after a period of non-transmission state, calibration such as AGC gain adjustment or the like has to be performed. Thus, the present embodiment realizes the shortening of time of transition from the sleep mode to the normal mode by incorporating a calibration function to the transfer of signals necessary in the procedure of transitioning from the sleep mode to the normal mode.

Additionally, in the above explanation, expressions such as broadband receiving means and broadband receiver are used. In case of the master device, these expressions both correspond to the broadband receiving amplifier 314 shown in FIG. 9. On the other hand, in case of the slave device, they both correspond to the broadband receiving amplifier 344 shown in FIG. 10. Similarly, in the above explanation, expressions such as narrow band receiving means and narrow band receiver are used. In case of the master device, these expressions both correspond to the narrow band receiving amplifier 324 shown in FIG. 9. On the other hand, in case of the slave device, they both correspond to the narrow band receiving amplifier 354 shown in FIG. 10. Furthermore, the encoder 304 of FIG. 9 corresponds to the encoder 192 of FIG. 5, and the data clock generator 310 corresponds to the PLL unit 158. Furthermore, the decoder 346 of FIG. 10 corresponds to the decoder 194, and the data clock generator 340 of FIG. 10 corresponds to the clock detection unit 196.

It should be understood by those skilled in the art that various modifications, combinations, sub-combinations and alterations may occur depending on design requirements and other factors insofar as they are within the scope of the appended claims or the equivalents thereof.

For example, in the description of the above-described embodiment, it is stated that the operation of the narrow band receiving means is disabled in the sleep mode (and the deep sleep mode). However, if the consumption power of the narrow band receiving means is small, the operation state can be maintained. Also with regard to the operation of narrow band transmitting means, the power consumption can be reduced by placing the narrow band transmitting means in a standby state at times other than transmission time, for example. Furthermore, power consumption amount can be further reduced by intermittently operating the narrow band receiving means. As described, the configuration can be simplified or the power consumption can be further reduced by further refining the operation of the narrow band receiving means.

The present application contains subject matter related to that disclosed in Japanese Priority Patent Application JP 2009-143205 filed in the Japan Patent Office on Jun. 16, 2009, the entire content of which is hereby incorporated by reference.

What is claimed is:

1. An information processing apparatus comprising:
   a first module including
      a first narrow band communication unit for performing narrow band communication with a second module,
      a first broadband communication unit for performing broadband communication with the second module,
      a first operation control unit for controlling an operation state of the first broadband communication unit according to an operation mode, and
      a mode switching unit for transmitting, via the first broadband communication unit, a mode switching signal for switching the operation mode from a first operation mode to a second operation mode; and
   the second module including
      a second narrow band communication unit for performing narrow band communication with the first module,
      a second broadband communication unit for performing broadband communication with the first module, and
      a second operation control unit for controlling an operation state of the second broadband communication unit according to an operation mode,
   wherein the first operation control unit places the first broadband communication unit in an operation state in the first operation mode, and places the first broadband communication unit in a standby state in the second operation mode,
   the second operation control unit places the second broadband communication unit in an operation state in the first operation mode, places the second broadband communication unit in a standby state in the second operation mode, transmits a response signal indicating a reception success of the mode switching signal to the first module via the second broadband communication unit in case the mode switching signal is received via the second broadband communication unit, and then places the second broadband communication unit in a standby state, and
   the first operation control unit places the first broadband communication unit in a standby state in case the response signal is received via the first broadband communication unit.

2. The information processing apparatus according to claim 1,
   wherein the first module further includes a first clock pulse transmission unit for transmitting a clock pulse to the second module, and
   wherein, in case of switching from the second operation mode to the first operation mode,
      the first operation control unit places the first broadband communication unit in an operation state,
      the first clock pulse transmission unit transmits the clock pulse to the second module, and the second operation control unit places the second broadband communication unit in an operation state in case the clock pulse transmitted by the first clock pulse transmission unit is received.

3. The information processing apparatus according to claim 2,
wherein the first clock pulse transmission unit transmits the clock pulse to the second module via the first narrow band communication unit, and
wherein the second operation control unit places the second broadband communication unit in an operation state in case the clock pulse is received via the second narrowband communication unit.

4. The information processing apparatus according to claim 3,
wherein, in case the first broadband communication unit transitions to an operation state under a control of the first operation control unit, the first module transmits a packet via the first broadband communication unit,
wherein, in case the second broadband communication unit transitions to an operation state under a control of the second operation control unit, the second module transmits a packet via the second broadband communication unit, and
wherein completion of switching from the second operation mode to the first operation mode is confirmed by confirming reception of a packet at the first broadband communication unit and the second broadband communication unit.

5. The information processing apparatus according to claim 1,
wherein the second module further includes a clock pulse transmission unit for transmitting a clock pulse to the first module, and
wherein, in case of switching from the second operation mode to the first operation mode,
the second operation control unit places the second broadband communication unit in an operation state,
the clock pulse transmission unit transmits the clock pulse to the first module, and
the first operation control unit places the first broadband communication unit in an operation state in case the clock pulse transmitted by the clock pulse transmission unit is received.

6. The information processing apparatus according to claim 5,
wherein the clock pulse transmission unit transmits the clock pulse to the first module via the second narrow band communication unit, and
wherein the first operation control unit places the first broadband communication unit in an operation state in case the clock pulse is received via the first narrow band communication unit.

7. The information processing apparatus according to claim 6,
wherein, in case the first broadband communication unit transitions to an operation state under a control of the first operation control unit, the first module transmits a packet via the first broadband communication unit,
wherein, in case the second broadband communication unit transitions to an operation state under a control of the second operation control unit, the second module transmits a packet via the second broadband communication unit, and
wherein completion of switching from the second operation mode to the first operation mode is confirmed by confirming reception of a packet at the first broadband communication unit and the second broadband communication unit.

8. The information processing apparatus according to claim 1,
wherein the second module further includes a clock generation unit for generating a clock, and
wherein the second operation control unit places the second broadband communication unit in a standby state and places the clock generation unit in a standby state in a third operation mode different from the first and the second operation modes.

9. The information processing apparatus according to claim 1, wherein the first broadband communication unit encodes data into a code form not including a DC component, and transmits the data.

10. The information processing apparatus according to claim 9,
wherein the first broadband communication unit encodes data into a code form which does not include a DC component and whose polarity is inverted every half cycle of a clock, and transmits the data, and
wherein the second broadband communication unit regenerates, by detecting a polarity inversion cycle, the clock from a received waveform of the data transmitted by the first broadband communication unit, and decodes the data by using the clock.

11. The information processing apparatus according to claim 10, wherein the first broadband communication unit generates encoded data by encoding data into a code form not including a DC component, encodes the data into a code form obtained by synchronously adding a clock having amplitude larger than that of the encoded data, and transmits the data.

12. The information processing apparatus according to claim 1,
wherein the first module further includes a computational processing unit for generating data to be transmitted via the first broadband communication unit,
wherein the second module further includes an output unit for outputting data received via the second broadband communication unit, and
wherein the output unit is a combination of one or more of an audio output device, an image output device and a communication device.

13. The information processing apparatus according to claim 1,
wherein the first module further includes an output unit for outputting data received via the first broadband communication unit,
wherein the second module further includes a computational processing unit for generating data to be transmitted via the second broadband communication unit, and
wherein the output unit is a combination of one or more of an audio output device, an image output device and a communication device.

14. A mode switching method performed by an information processing apparatus including a first module that includes a first narrow band communication unit for performing narrow band communication with a second module, a first broadband communication unit for performing broadband communication with the second module, and a mode switching unit for transmitting, via the first broadband communication unit, a mode switching signal for switching the operation mode from a first operation mode to a second operation mode, and the second module that includes a second narrow band communication unit for performing narrow band communication with the first module and a second broadband communication unit for performing broadband communication with the first module, comprising the steps of:
placing the first broadband communication unit in a standby state and placing the second broadband communication unit in a standby state in case of transition from the first operation mode to the second operation mode;
placing the first broadband communication unit in an operation state placing the second broadband communication unit in an operation state in case of transition from the second operation mode to the first operation mode, transmitting a response signal indicating a reception success of the mode switching signal to the first module via the second broadband communication unit in case the mode switching signal is received via the second broadband communication unit, and then placing the second broadband communication unit in a standby state; and
placing the first broadband communication unit in a standby state in case the response signal is received via the first broadband communication unit.

* * * * *